United States Patent
Yim et al.

(10) Patent No.: US 10,141,579 B2
(45) Date of Patent: Nov. 27, 2018

(54) METAL OXIDE-CARBON NANOMATERIAL COMPOSITE, METHOD OF PREPARING THE SAME, CATALYST, METHOD OF PREPARING THE SAME, AND CATALYST LAYER FOR FUEL CELL ELECTRODES

(71) Applicant: KOREA INSTITUTE OF ENERGY RESEARCH, Daejeon (KR)

(72) Inventors: Sung Dae Yim, Daejeon (KR); Seong Hun Cho, Chungcheongbuk-do (KR); Kwang Hyun Chang, Daejeon (KR); Eun Ja Lim, Gyeonggi-do (KR); Tae Hyun Yang, Daejeon (KR); Young Jun Sohn, Daejeon (KR); Byung Chan Bae, Daejeon (KR); Seok Hee Park, Daejeon (KR); Gu Gon Park, Daejeon (KR); Chang Soo Kim, Incheon (KR); Seung Gon Kim, Daejeon (KR); Min Jin Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 94 days.

(21) Appl. No.: 15/256,172

(22) Filed: Sep. 2, 2016

(65) Prior Publication Data
US 2017/0069916 A1 Mar. 9, 2017

(30) Foreign Application Priority Data

Sep. 3, 2015 (KR) .................. 10-2015-0124993
Sep. 3, 2015 (KR) .................. 10-2015-0124994

(51) Int. Cl.
*H01M 4/92* (2006.01)
*H01M 4/88* (2006.01)
(Continued)

(52) U.S. Cl.
CPC ......... *H01M 4/926* (2013.01); *H01M 4/8673* (2013.01); *H01M 4/9041* (2013.01);
(Continued)

(58) Field of Classification Search
CPC .. H01M 4/926; H01M 4/8657; H01M 4/8828; H01M 4/8882; H01M 4/8896;
(Continued)

(56) References Cited

U.S. PATENT DOCUMENTS

2007/0173585 A1* 7/2007 Sevenich .................. D01F 1/10
524/445
2013/0184144 A1* 7/2013 Liang ..................... B82Y 40/00
502/4

(Continued)

FOREIGN PATENT DOCUMENTS

| CN | 101516774 A | 8/2009 |
|---|---|---|
| JP | 2005-072015 A | 3/2005 |
| KR | 1020060004780 A | 1/2006 |
| KR | 1020090064546 A | 6/2009 |
| KR | 1020110090348 A | 8/2011 |
| WO | 2012/157506 A1 | 11/2012 |

(Continued)

*Primary Examiner* — Muhammad S Siddiquee
(74) *Attorney, Agent, or Firm* — Dorsey & Whitney LLP

(57) ABSTRACT

Provided are a metal oxide-carbon nanomaterial composite, a method of preparing the metal oxide-carbon nanomaterial composite, a catalyst, a method of preparing the catalyst, and a catalyst layer that includes the catalyst and that is used for fuel cell electrodes. The metal oxide-carbon nanomaterial composite includes a metal oxide particle having a specific surface area of 5 square meters per gram (m2/g) or less, and a carbon nanomaterial formed on a surface of the metal oxide particle. The catalyst includes a metal oxide-carbon nanomaterial composite in which a carbon nanomaterial is formed on a metal oxide particle, and an active metal particle formed on a surface of the carbon nanomaterial.

13 Claims, 13 Drawing Sheets

(51) Int. Cl.
*H01M 4/94* (2006.01)
*H01M 8/083* (2016.01)
*H01M 8/086* (2016.01)
*H01M 8/1011* (2016.01)
*H01M 4/86* (2006.01)
*H01M 4/90* (2006.01)
H01M 8/1018 (2016.01)

(52) U.S. Cl.
CPC ....... *H01M 4/9075* (2013.01); *H01M 4/9083* (2013.01); *H01M 4/925* (2013.01); *H01M 2008/1095* (2013.01)

(58) Field of Classification Search
CPC ........ H01M 4/94; H01M 8/083; H01M 8/086; H01M 8/1004; H01M 8/1018; H01M 8/1011; H01M 4/8673; H01M 2008/1095
See application file for complete search history.

(56) References Cited

U.S. PATENT DOCUMENTS

| | | | |
|---|---|---|---|
| 2014/0113127 A1* | 4/2014 | Tominaga | H01M 4/583 428/323 |
| 2014/0332733 A1* | 11/2014 | Joo | D04H 1/4234 252/513 |
| 2016/0194480 A1* | 7/2016 | Condo | C08J 5/24 523/223 |

* cited by examiner

METAL OXIDE-CARBON NANOMATERIAL COMPOSITE, METHOD OF PREPARING THE SAME, CATALYST, METHOD OF PREPARING THE SAME, AND CATALYST LAYER FOR FUEL CELL ELECTRODES

CROSS REFERENCE TO RELATED APPLICATIONS

This application claims the benefit of priority of Korean Patent Application No. 10-2015-0124993 filed on 3 Sep. 2015 and of Korean Patent Application No. 10-2015-0124994 filed on 3 Sep. 2015 the disclosures of which are incorporated herein by reference.

TECHNICAL FIELD

Embodiments relate to a metal oxide-carbon nanomaterial composite, a method of preparing the metal oxide-carbon nanomaterial composite, a catalyst, a method of preparing the catalyst, and a catalyst layer that includes the catalyst and that is used for fuel cell electrodes

BACKGROUND

A fuel cell includes an anode (that is, a fuel electrode) to electrochemically oxidize supplied fuel, a cathode (that is, an air electrode) to electrochemically reduce an oxidizing agent, and an electrolyte membrane that is interposed between the anode and the cathode to provide a path for transferring ions generated at the anode to the cathode. Electrons may be generated through a fuel oxidation reaction at the anode, may work via an arbitrary external circuit, and may be returned to the cathode to reduce the oxidizing agent. Since catalysts that are contained in the anode and the cathode and that catalyze an electrochemical reaction are regarded to be very important in the fuel cell configured as described above, various attempts have been made to increase an activity of a catalyst used in an electrode. In general, since an intrinsic activity of a catalyst increases as a reaction surface area of the catalyst increases, an effort has been made to increase the reaction surface area by reducing a diameter of particles of the catalyst, and various attempts have been made to uniformly distribute a catalyst with a higher activity on an electrode to efficiently transfer materials during an inflow of a reactant and a discharge of a product. Since a relatively large number of micropores are provided when a support with a high specific surface area is currently prepared in a catalyst for a fuel cell, it may be difficult to form a triple phase boundary based on conditions required for an oxygen reduction reaction (ORR), and a performance of the full cell may continue to decrease due to a mass transport limitation despite a low loss of a chemical reaction rate. Thus, research has been actively conducted on carbon materials with a large amount of graphite having mesopores. The conditions required for the ORR may include a carbon support, a catalyst of a noble metal, for example, platinum (Pt), and an ionomer, for example, Nafion, that moves a hydrogen cation.

A catalyst support for a fuel cell needs to have a large surface area due to high porosity and a high electrical conductivity for a flow of electrons. Amorphous microporous carbon powders known as activated carbon or carbon black are widely used as a catalyst support for the fuel cell, however, are vulnerable to durability in an operating condition of the fuel cell in a strong acid atmosphere. A porosity and an average pore size that are physical properties of a catalyst layer of an electrode for a fuel cell are key manufacture variables that have a decisive influence on a performance of the fuel cell. The performance of the fuel cell may decrease because water generated in an air electrode, that is, a cathode is not efficiently removed and oxygen required for the ORR is not sufficiently supplied. To increase a performance of the ORR in the air electrode, an attempt was made to use vertically aligned carbon nanotubes (VACNTs) as a catalyst support. However, to grow carbon nanotubes (CNTs) and to support a catalyst on the CNTs, expensive equipment, for example, a plasma-enhanced chemical vapor deposition (PECVD) machine or a sputter, needs to be used in a vacuum condition.

Based on a requirement for a high capacity of a secondary battery, research has been actively conducted on high-capacity anode materials, for example, Tin (Sn) or silicon (Si), having a high capacity per unit weight in comparison to carbon-based anode materials that are widely used. However, when high-capacity anode materials are used, a volume may be expanded, a performance of a battery charging and discharging cycle may decrease.

When crystalline carbon, for example, CNTs or graphene, are used as anode and cathode conductive materials, an electrical conductivity and energy density are very excellent and reversibility of a charging and discharging process is superior to amorphous carbon. There is an industrial demand for a more efficient method of using replacements for anode and cathode conductive materials in which carbon materials, for example, activated carbon or carbon black, are mainly used.

The information included in this Background section of the specification, including any references cited herein and any description or discussion thereof, is included for technical reference purposes only and is not to be regarded subject matter by which the scope of the invention as defined in the claims is to be bound.

SUMMARY

Embodiments provide a metal oxide-carbon nanomaterial composite and a method of preparing the metal oxide-carbon nanomaterial composite that may increase an active surface area of a catalyst that accelerates an electrochemical reaction and that may efficiently discharge water and supply oxygen through mesopores and macropores provided when an aggregate of metal oxide-carbon nanomaterial composites is formed. The metal oxide-carbon nanomaterial composite may be used as a catalyst support, in particular, a catalyst support for fuel cell electrodes. Also, the embodiments provide a catalyst that may have a relatively large number of mesopores and an enhanced electrical conductivity and an enhanced stability and that may efficiently discharge water and supply oxygen, provide a method of preparing the catalyst, and provide a catalyst layer that includes the catalyst and that is used for fuel cell electrodes.

However, the problems to be solved in the present disclosure are not limited to the foregoing problems, and other problems not mentioned herein would be clearly understood by one of ordinary skill in the art from the following description.

According to an aspect, there is provided a metal oxide-carbon nanomaterial composite including a metal oxide particle having a specific surface area of 5 square meters per gram (m2/g) or less, and a carbon nanomaterial formed on a surface of the metal oxide particle.

The metal oxide particle may include at least one of silica, alumina, magnesia, titania, barium titania, zirconia, ceria, germania, manganese oxide and zeolite. The metal oxide particle may have a diameter of 0.3 micrometers (μm) to 10 μm. The carbon nanomaterial may include at least one of a single-walled carbon nanotube (SWCNT), a double-walled carbon nanotube (DWCNT), a multi-walled carbon nanotube (MWCNT) and a carbon nanorod. The carbon nanomaterial may be present in an amount of 5% by weight (wt %) to 80 wt % in the metal oxide-carbon nanomaterial composite.

A length of the carbon nanomaterial may be 0.05 to 3 times a diameter of the metal oxide particle, and the carbon nanomaterial may have a diameter of 5 nanometers (nm) to 100 nm.

A weight ratio of the metal oxide particle:the carbon nanomaterial may range from 95:5 to 20:80.

The metal oxide-carbon nanomaterial composite may have a specific surface area of 20 m2/g to 100 m2/g. The metal oxide-carbon nanomaterial composite may have a shape of a sea urchin or a cocoon.

The metal oxide-carbon nanomaterial composite may further include an active metal formed on the metal oxide particle. The active metal may be a transition metal or a lanthanum-based element.

According to another aspect, there is provided a method of preparing a metal oxide-carbon nanomaterial composite, the method including preparing a metal oxide particle having a specific surface area of 5 m2/g or less, forming an active metal layer by coating a surface of the metal oxide particle with an active metal precursor, and growing a carbon nanomaterial formed on the active metal layer.

The active metal precursor may include a precursor of a transition metal or a precursor of a lanthanum-based element.

The forming may include adding an acidic material.

The method may further include calcining the metal oxide particle on which the active metal layer is formed.

The growing may include supplying a carbon source gas, a mixture of the carbon source gas and an inert gas, a mixture of the carbon source gas and a reducing gas, or a mixture of the carbon source gas, the inert gas and the reducing gas to the active metal layer to allow the carbon source gas and the mixtures to react with the active metal layer.

According to another aspect, there is provided a catalyst including a metal oxide-carbon nanomaterial composite in which a carbon nanomaterial is formed on a metal oxide particle, and an active metal particle formed on a surface of the carbon nanomaterial.

The metal oxide particle may include at least one of silica, alumina, magnesia, titania, barium titania, zirconia, ceria, germania, manganese oxide and zeolite. The metal oxide particle may have a diameter of 0.3 μm to 10 μm. The metal oxide particle may be present in an amount of 20 wt % to 98 wt % in the catalyst. The metal oxide particle may have a specific surface area of 5 m2/g or less.

The carbon nanomaterial may include at least one of an SWCNT, a DWCNT, an MWCNT and a carbon nanorod. The carbon nanomaterial may be present in an amount of 5 wt % to 80 wt % in the catalyst. The carbon nanomaterial may have a diameter of 5 nm to 100 nm.

The metal oxide-carbon nanomaterial composite may have a specific surface area of 20 m2/g to 100 m2/g. The metal oxide-carbon nanomaterial composite may have a shape of a sea urchin or a cocoon.

The active metal particle may include at least one of platinum (Pt), gold (Au), ruthenium (Ru), palladium (Pd), rhodium (Rh), iridium (Ir), osmium (Os), niobium (Nb), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tin (Sn), tungsten (W), tantalum (Ta) and lead (Pb). The active metal particle may have a diameter of 2 nm to 10 nm. The active metal particle may be present in an amount of 10 wt % to 80 wt % in the catalyst.

According to another aspect, there is provided a method of preparing a catalyst, the method including forming a metal oxide-carbon nanomaterial composite by forming a carbon nanomaterial on a metal oxide particle having a specific surface area of 5 m2/g or less, and forming an active metal particle on a surface of the carbon nanomaterial by adding the metal oxide-carbon nanomaterial composite in a solution including an active metal precursor. The carbon nanomaterial may be formed on the metal oxide particle by growing or attaching the carbon nanomaterial onto the metal oxide particle.

The method may further include, after the forming of the metal oxide-carbon nanomaterial composite, attaching a functional group to the carbon nanomaterial.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1:
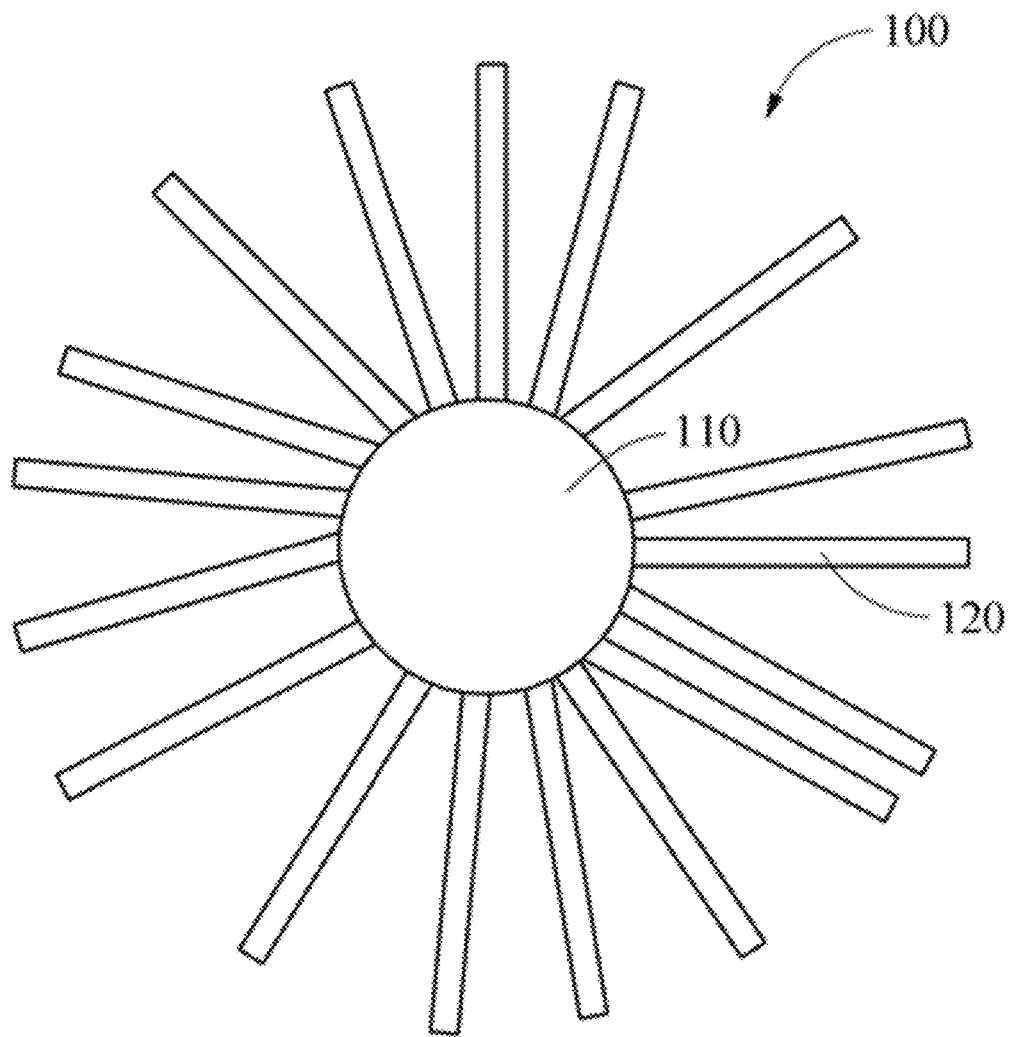
FIG. 1 is a diagram illustrating an example of a metal oxide-carbon nanomaterial composite according to an embodiment.

Hereinafter, embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the embodiments and thus may be changed depending on a user, the intent of an operator, or a custom. Accordingly, the terms must be defined based on the following overall description of this specification. Like reference numerals present in the drawings refer to the like elements throughout.

Through the whole document, the term "on" that is used to designate a position of one element with respect to another element includes both a case that the one element is adjacent to the another element and a case that any other element exists between these two elements.

It will be understood throughout the whole specification that, unless specified otherwise, when one part "includes" or "comprises" one component, the part does not exclude other components but may further include the other components.

Hereinafter, a metal oxide-carbon nanomaterial composite and a method of preparing the metal oxide-carbon nanomaterial composite will be described in detail with reference to embodiments and drawings. However, the present disclosure is not limited to these embodiments and drawings.

According to an embodiment, a metal oxide-carbon nanomaterial composite may include a metal oxide particle having a specific surface area of 5 square meters per gram (m2/g) or less, and a carbon nanomaterial formed on a surface of the metal oxide particle.

The metal oxide-carbon nanomaterial composite may be used as a catalyst support, and may be applicable to various fields, for example, a fuel cell, a secondary battery, energy materials, functional composite materials, medicine or a semiconductor. For example, the metal oxide-carbon nanomaterial composite may be used as a catalyst support for fuel cell electrodes, or as anode or cathode conductive materials of a secondary battery. However, the present disclosure is not limited thereto.

In the metal oxide-carbon nanomaterial composite, a metal oxide particle corresponding to a core particle may have a small specific surface area. For example, when a metal oxide particle has a plurality of pores, that is, a large specific surface area, the metal oxide particle may be broken in a process of growing a carbon nanomaterial on the metal oxide particle by placing carbon source materials in the pores. Thus, the small specific surface area of the metal oxide particle may be regarded as an important technical feature in the present disclosure. However, to use the metal oxide-carbon nanomaterial composite as a support of a catalyst for fuel cell electrodes, a sufficient area in which the catalyst is to be supported may be required. Thus, in the present disclosure, a carbon nanomaterial with a large specific surface area may be provided as a technical solution.

The metal oxide-carbon nanomaterial composite may have a shape of a sea urchin or a cocoon and may include a carbon nanomaterial with a large specific surface area, and accordingly the metal oxide-carbon nanomaterial composite may be used as a support on which a large amount of an active metal for fuel cell electrodes as a catalyst is supported. When an aggregate including a plurality of metal oxide-carbon nanomaterial composites is formed, the carbon nanomaterial may function as a buffer to absorb an impact between the metal oxide-carbon nanomaterial composites. Pores including mesopores, macropores or both may be formed between a plurality of metal oxide-carbon nanomaterial composites, and thus it is possible to increase an active surface area of a catalyst that accelerates an electrochemical reaction to be used for fuel cell electrodes and also possible to efficiently discharge water and supply oxygen, when the metal oxide-carbon nanomaterial composites are used as supports for the catalyst. Thus, the metal oxide-carbon nanomaterial composites may be excellent in a stability, an electrical conductivity and a mechanical strength, and accordingly an electrode with an excellent performance may be manufactured based on the metal oxide-carbon nanomaterial composites.

FIG. 1 is a diagram illustrating an example of a metal oxide-carbon nanomaterial composite 100 according to an embodiment. The metal oxide-carbon nanomaterial composite 100 of FIG. 1 may include a metal oxide particle 110 and a carbon nanomaterial 120 formed on a surface of the metal oxide particle 110. Relative sizes of the metal oxide particle 110 and the carbon nanomaterial 120 in FIG. 1 may be expressed to be exaggerated for understanding of a configuration of the metal oxide-carbon nanomaterial composite 100, and may be different from actual relative sizes of the metal oxide particle 110 and the carbon nanomaterial 120.

The metal oxide particle 110 may include, for example, at least one of silica, alumina, magnesia, titania, barium titania, zirconia, ceria, germania, manganese oxide and zeolite.

For example, when the metal oxide particle 110 is alumina, the alumina may be structurally stable, may participate in reactions due to weak acid center, and may be excellent in physical and mechanical properties required as a support due to an excellent dispersibility.

The metal oxide particle 110 may have a diameter of 0.3 micrometers (μm) to 10 μm and desirably a diameter of 2 μm to 5 μm. When the diameter of the metal oxide particle 110 is less than 0.3 μm, a sufficient space in which an active metal for fuel cell electrodes is to be effectively supported may not be secured when the metal oxide-carbon nanomaterial composite 100 is used as a support of the active metal, due to a small space between carbon nanomaterials 120 formed on the surface of the metal oxide particle 110. When the diameter of the metal oxide particle 110 exceeds 10 μm, it may be difficult to obtain a desired electrical conductivity despite an increase in a size of pores between metal oxide-carbon nanomaterial composites that form an aggregate.

The metal oxide particle 110 may have a specific surface area of 5 m2/g or less, which may indicate that the surface of the metal oxide particle 110 is relatively smooth and that the metal oxide particle 110 does not have a micropore. Thus, it is possible to prevent metal oxide particles from being broken while carbon nanomaterials are grown from carbon source materials that permeate into micropores. A surface area of carbon nanomaterials formed on the surface of the metal oxide particle 110 may greatly increase despite a relatively small specific surface area due to the smooth surface of the metal oxide particle 110. When the metal oxide-carbon nanomaterial composite 100 is used as a support of an active metal for fuel cell electrodes, a sufficient surface area to support a large number of active metal particles on the metal oxide-carbon nanomaterial composite 100 may be provided.

The metal oxide particle 110 may desirably have a spherical shape so that carbon nanomaterials 120 may be uniformly and radially formed, however, there is no limitation thereto. For example, the spherical shape may have a sphericity of 0.5 to 1 represented by a/b in which a denotes a smaller diameter and b denotes a larger diameter. Depending on circumstances, nonspherical particles may be used to more effectively secure and utilize a space due to an irregular shape of the nonspherical particles. In addition, the metal oxide particle 110 may have a polyhedral shape instead of an elliptical shape. For example, when carbon nanomaterials are grown to increase a surface area on which an active metal for fuel cell electrodes is supported, a shape of metal oxide may not be limited.

The carbon nanomaterial 120 may include, for example, at least one of a single-walled carbon nanotube (SWCNT), a double-walled carbon nanotube (DWCNT), a multi-walled carbon nanotube (MWCNT) and a carbon nanorod. When the MWCNT is used as the carbon nanomaterial 120, 3 to 20 walls may be provided, a specific surface area of the MWCNT may be increased by controlling an amount of the carbon nanomaterial 120, and the MWCNT may have a high conductivity due to an extremely large amount of graphite in comparison to carbon black or activated carbon.

The carbon nanomaterial 120 may be present in an amount of 5% by weight (wt %) to 80 wt % in the metal oxide-carbon nanomaterial composite 100. When the amount of the carbon nanomaterial 120 is less than 5 wt %, a sufficient space in which an active metal for fuel cell electrodes is to be supported may not be provided due to a small surface area of the metal oxide-carbon nanomaterial composite 100, and an electrical conductivity may be reduced due to a large amount of the metal oxide particle 110 corresponding to a core particle in the metal oxide-carbon nanomaterial composite 100. When the amount of the carbon nanomaterial 120 exceeds 80 wt %, a size of the metal oxide-carbon nanomaterial composite 100 may excessively increase due to an increase in the amount of the carbon nanomaterial 120 and a density of the carbon nanomaterials 120 may increase, and accordingly a space between carbon nanomaterials 120 may disappear. Thus, mesopores or macropores may not be effectively provided when metal oxide-carbon nanomaterial composites to be used in the present disclosure form an aggregate.

A length of the carbon nanomaterial 120 may be 0.05 to 3 times a diameter of the metal oxide particle 110. The carbon nanomaterial 120 may have a length of 0.015 μm to 30 μm. When the metal oxide-carbon nanomaterial composite 100 is used as a support of an active metal for fuel cell electrodes as a catalyst, the carbon nanomaterial 120 may function as a buffer to absorb an impact between particles in manufacturing of fuel cell electrodes at a high pressure.

The carbon nanomaterial 120 may have a diameter of 5 nm to 100 nm. When the carbon nanomaterial 120 is a carbon nanotube (CNT), a diameter of the CNT may refer to an external diameter of the CNT. A cross section of a tube form may be circular and may include a hollow or a pore having an elliptical shape or a slightly distorted ellipse. The hollow or pore may have all shapes recognized as a circular shape or elliptical shape. When the diameter of the carbon nanomaterial 120 is less than 5 nm, carbon nanomaterials generated at the same yield may be entangled, which may lead to a reduction in a pore size. When the diameter of the carbon nanomaterial 120 exceeds 100 nm, a larger amount of carbon nanomaterials may be used in a required conductivity percolation due to an increase in a gap between carbon nanomaterials.

A weight ratio of the metal oxide particle 110:the carbon nanomaterial 120 may range from 95:5 to 20:80. When the weight ratio is less than 95:5, the generated metal oxide-carbon nanomaterial composite 100 may have a small surface area and a low conductivity. When the weight ratio exceeds 20:80, a size of the metal oxide-carbon nanomaterial composite 100 may increase and carbon nanomaterials may be frequently entangled despite a large amount of graphitic carbon with a high electrical conductivity, which may lead to a reduction in a size of pores to interfere with efficient material transfer of water and reaction gas.

The metal oxide-carbon nanomaterial composite 100 may have a specific surface area of 20 m2/g to 100 m2/g. When the specific surface area of the metal oxide-carbon nanomaterial composite 100 is less than 20 m2/g, a sufficient surface area to support active metal particles on the metal oxide-carbon nanomaterial composite 100 may not be provided when the metal oxide-carbon nanomaterial composite 100 is used as a support of an active metal for fuel cell electrodes as a catalyst. When the specific surface area of the metal oxide-carbon nanomaterial composite 100 exceeds 100 m2/g, an aspect ratio of the carbon nanomaterial 120 may excessively increase, carbon nanomaterials 120 may be vertically grown to be entangled with each other for morphological stability, which may lead to a reduction in a size of pores between the carbon nanomaterials 120. Also, when the metal oxide-carbon nanomaterial composite 100 is used in manufacturing of an electrode of a fuel cell, it may be difficult to discharge water and sufficiently supply oxygen to an air electrode.

The metal oxide-carbon nanomaterial composite 100 may have a shape of a sea urchin or a cocoon. For example, the metal oxide-carbon nanomaterial composite 100 may have a shape similar to that of the sea urchin or the cocoon because carbon nanomaterials 120 extend radially from the surface of the metal oxide particle 110

Figure 2:
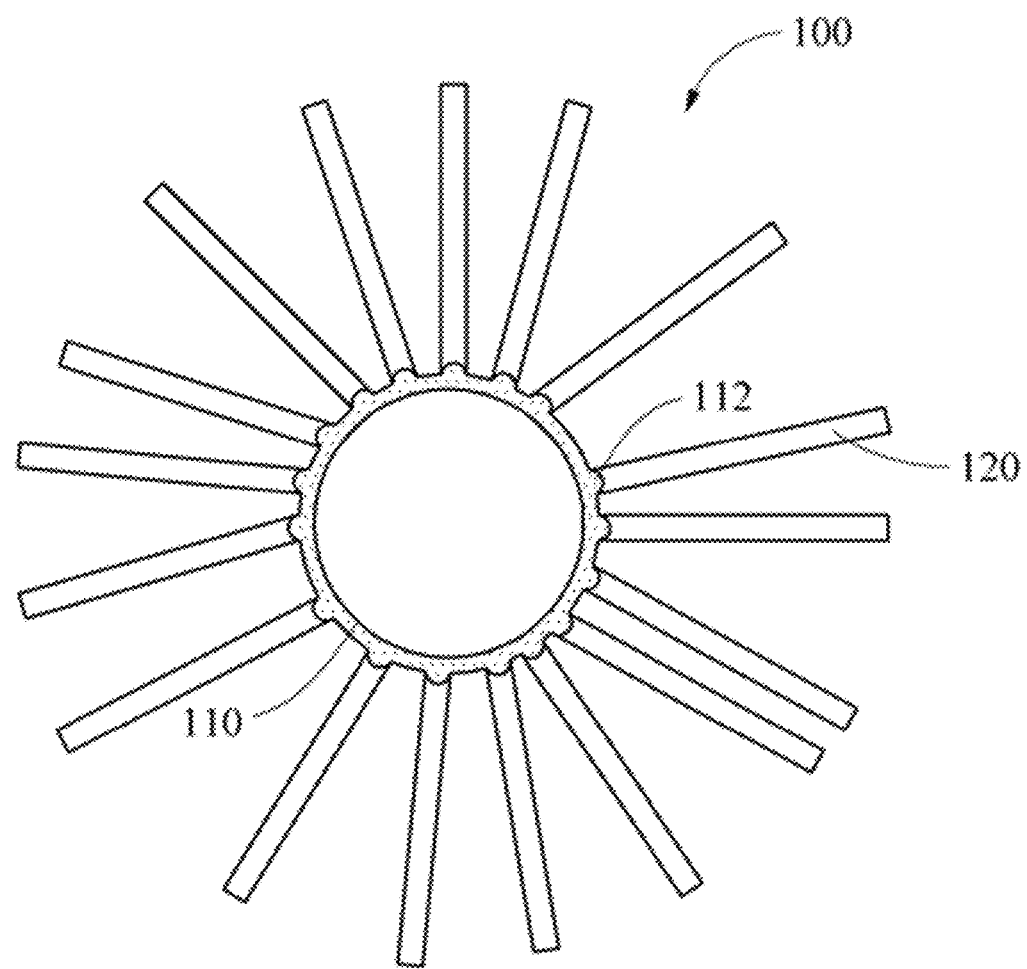
FIG. 2 is a diagram illustrating another example of a metal oxide-carbon nanomaterial composite according to an embodiment.

FIG. 2 is a diagram illustrating another example of the metal oxide-carbon nanomaterial composite 100 according to an embodiment. The metal oxide-carbon nanomaterial composite 100 of FIG. 2 may include an active metal layer 112 in addition to the metal oxide particle 110 and the carbon nanomaterial 120. The active metal layer 112 may be formed of the active metal, and may be formed on a portion or all of metal oxide. The active metal layer 112 may be formed on a surface of the metal oxide particle 110 before the carbon nanomaterial 120 is formed, and may function as a catalyst to facilitate growing of the carbon nanomaterial 120. As shown in FIG. 2, the active metal layer 112 is formed on the surface of the metal oxide particle 110 in the metal oxide-carbon nanomaterial composite 100, however, the active metal layer 112 may not be shown in the metal oxide-carbon nanomaterial composite 100 after the carbon nanomaterials 120 are formed as shown in FIG. 1 because the active metal layer 112 functions as a catalyst to facilitate a synthesis of the carbon nanomaterials 120.

The active metal may be a transition metal or a lanthanum-based element. An available transition metal may include, for example, iron (Fe), cobalt (Co), nickel (Ni), vanadium (V), niobium (Nb), tantalum (Ta), chromium (Cr), molybdenum (Mo), tungsten (W), manganese (Mn), rhenium (Re), ruthenium (Ru), osmium (Os), iridium (Ir), rhodium (Rh), palladium (Pd), platinum (Pt) or gold (Au). However, the present disclosure is not limited thereto. For example, the active metal may include a main catalyst including at least one of Co, Ni and Fe, and an auxiliary catalyst including at least one of Mo, V, Ta and Ti. However, distinction between the main catalyst and the auxiliary catalyst is relative, is merely an example and may be variable based on active metals used together. When Co is used as the active metal, a density, a yield and a size of the metal oxide-carbon nanomaterial composite 100 may increase. When Mo is used as the active metal, a shape of the metal oxide-carbon nanomaterial composite 100 may be well defined and the size of the metal oxide-carbon nanomaterial composite 100 may increase. When V is used as the active metal, the yield of the metal oxide-carbon nanomaterial composite 100 may increase. Thus, when the active metal is properly used based on a combination of the main catalyst and the auxiliary catalyst, a shape, a size, a density and a yield of the metal oxide-carbon nanomaterial composite 100 may be controlled.

The metal oxide-carbon nanomaterial composite 100 may further include a functional group (not shown) on a surface of the carbon nanomaterial 120. The functional group may be used to properly attach an active metal for fuel cell electrodes as a catalyst onto the surface of the carbon nanomaterial 120. Also, the functional group may be used to increase an electrical conductivity, a stability or a variety of performances of the metal oxide-carbon nanomaterial composite 100 by modifying the surface of the carbon nanomaterial 120.

When the metal oxide-carbon nanomaterial composite 100 is used as a support of an active metal for fuel cell electrodes as a catalyst, the active metal may be supported on the surface of the carbon nanomaterial 120 and may be included in the metal oxide-carbon nanomaterial composite 100. For example, a plurality of metal oxide-carbon nanomaterial composites including active metals for fuel cell electrodes as catalysts may be collected to form a catalyst layer of a fuel cell electrode. In this example, water may be efficiently discharged and oxygen may be supplied through mesopores or macropores formed between the plurality of metal oxide-carbon nanomaterial composites. Due to an interstitial volume between the metal oxide-carbon nanomaterial composites, open pore channels three-dimensionally connected to each other may be provided.

A fuel cell may include a cathode, an anode and an electrolyte membrane that is interposed between the anode and the cathode. At least one of the cathode and the anode may include a plurality of metal oxide-carbon nanomaterial composites 100 including an active metal for fuel cell electrodes as a catalyst. The fuel cell may be implemented as, for example, a phosphoric acid fuel cell (PAFC), a polymer electrolyte membrane fuel cell (PEMFC), a direct methanol fuel cell (DMFC) or an alkaline fuel cell (AFC).

According to an embodiment, a method of preparing a metal oxide-carbon nanomaterial composite may include preparing a metal oxide particle having a specific surface area of 5 m2/g or less, forming an active metal layer by coating a surface of the metal oxide particle with an active metal precursor, and growing a carbon nanomaterial formed on the active metal layer.

Figure 3:
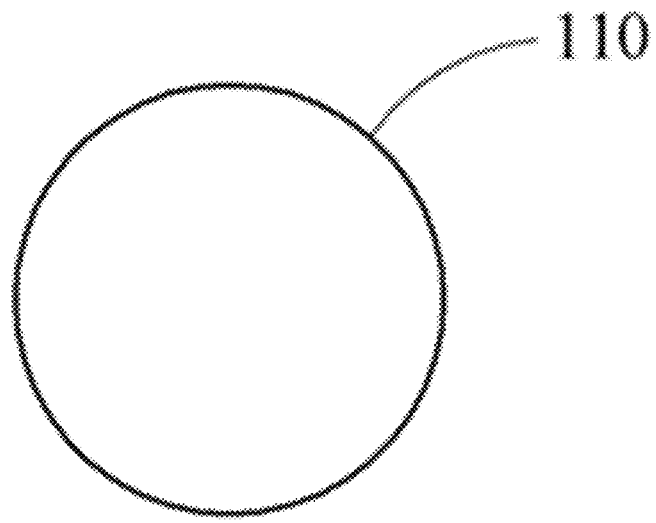
FIGS. 3, 4 and 5 are diagrams illustrating a process of preparing a metal oxide-carbon nanomaterial composite according to an embodiment.
Figure 4:
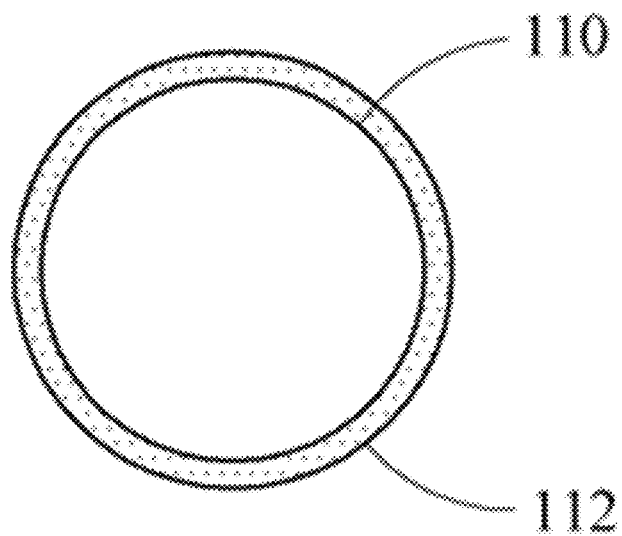
Figure 5:
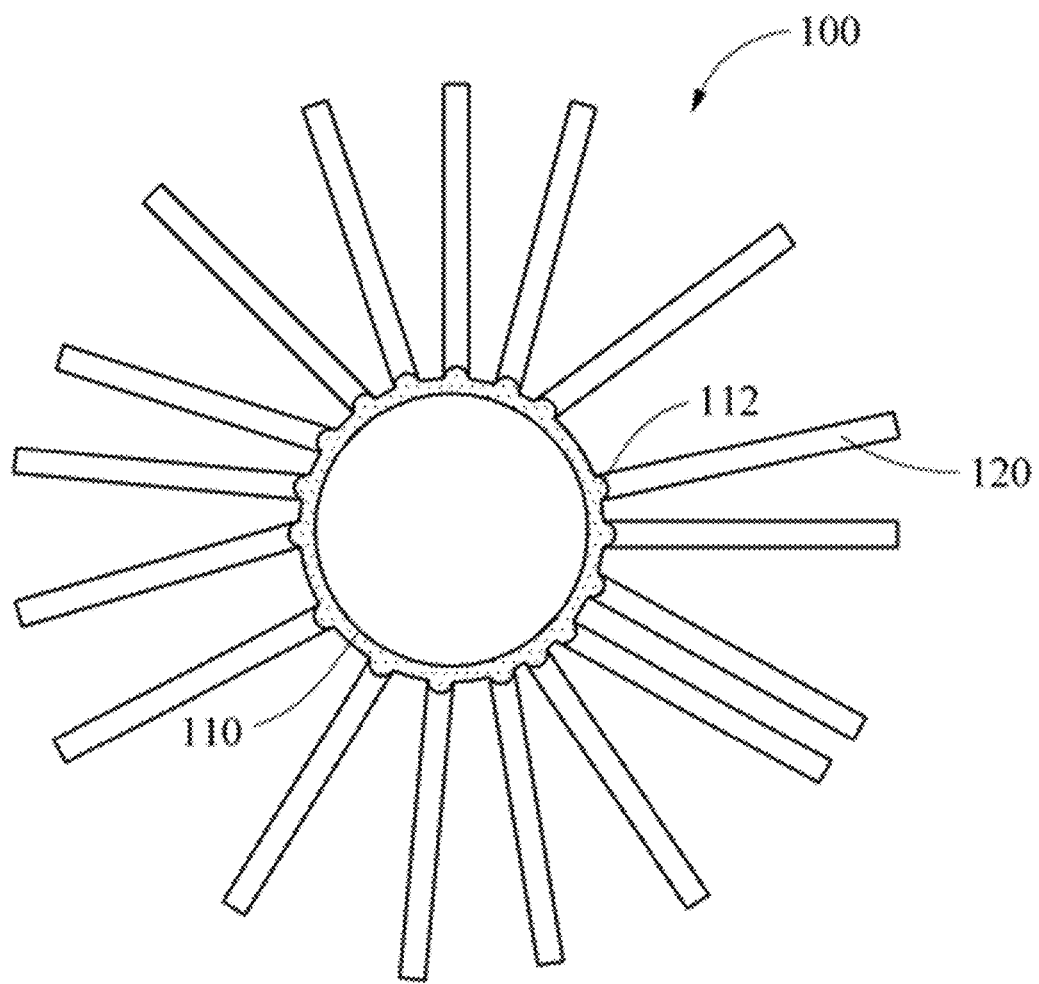
Figure 6:
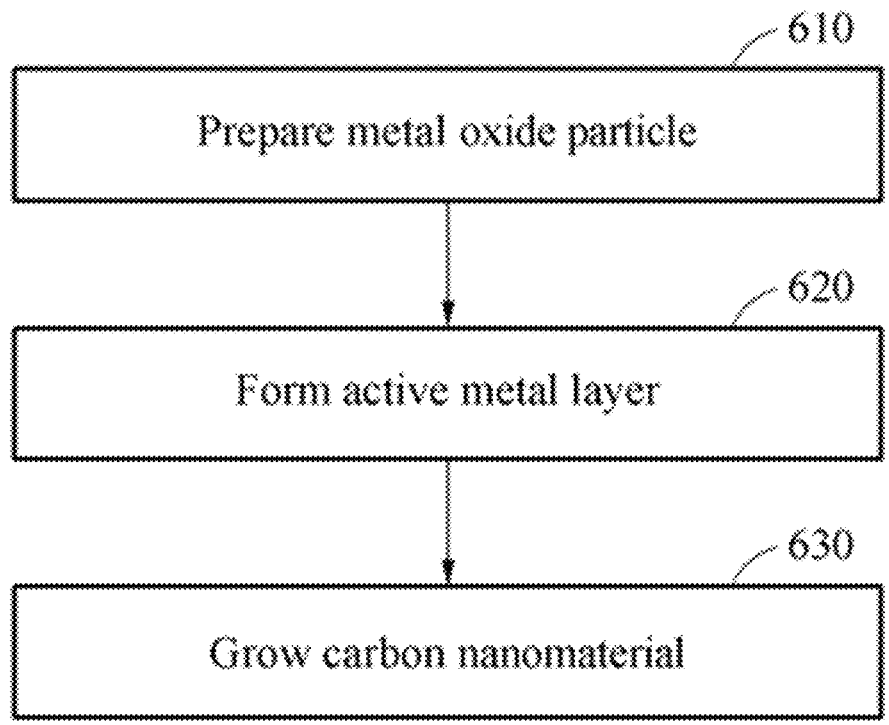
FIG. 6 is a flowchart illustrating a method of preparing a metal oxide-carbon nanomaterial composite according to an embodiment.

FIGS. 3, 4 and 5 are diagrams illustrating a process of preparing a metal oxide-carbon nanomaterial composite according to an embodiment, and FIG. 6 is a flowchart illustrating a method of preparing a metal oxide-carbon nanomaterial composite according to an embodiment. Referring to FIGS. 3 through 6, a method of preparing a metal oxide-carbon nanomaterial composite 100 may include operation 610 of preparing a metal oxide particle 110, operation 620 of forming an active metal layer 112 and operation 630 of growing a carbon nanomaterial 120.

Referring to FIGS. 3 and 6, in operation 610, the metal oxide particle 110 having a specific surface area of 5 m2/g or less may be prepared. The metal oxide particle 110 may have a relatively small surface area due to a smooth and nonporous surface, and thus it is possible to prevent the metal oxide particle 110 from being broken during formation of a carbon nanomaterial.

The metal oxide particle 110 may include at least one of silica, alumina, magnesia, titania, barium titania, zirconia, ceria, germania, manganese oxide and zeolite.

Referring to FIGS. 4 and 6, in operation 620, the active metal layer 112 may be formed by coating a surface of the metal oxide particle 110 with an active metal precursor. The active metal layer 112 may be formed on the surface of the metal oxide particle 110 before the carbon nanomaterial 120 is synthesized, and may be used to promote synthesis, that is, growing of the carbon nanomaterial 120.

The active metal layer 112 may be formed on the surface of the metal oxide particle 110 using an impregnation process, a sol-gel process, a deposition process or a sputtering process. Since the impregnation process or the sol-gel process is advantageously used to generate a large amount of the active metal layer 112 on the surface of the metal oxide particle 110 without a need to use separate equipment, an example of a process of forming the active metal layer 112 by a coating scheme based on a wet impregnation process will be described in the present disclosure. However, the present disclosure is not limited thereto.

The active metal precursor may be a precursor of a transition metal or a precursor of a lanthanum-based element. The precursor of the transition metal or the precursor of the lanthanum-based element may include various precursors, for example, transition metal nitrates, transition metal nitrides, transition metal hydroxides, transition metal oxides, transition metal oxalates, transition metal acetates (OAc), transition metal amines, transition metal chlorides, transition metal halides, transition metal carbonyl complexes, transition metal hydrates, lanthanum-based element nitrates, lanthanum-based element nitrides, lanthanum-based element hydroxides, lanthanum-based element oxides, lanthanum-based element oxalates, lanthanum-based element acetates (OAc), lanthanum-based element amines, lanthanum-based element chlorides, lanthanum-based element halides, lanthanum-based element carbonyl complexes, and lanthanum-based element hydrates.

A Co precursor may include, for example, cobalt(II) nitrate, cobalt(II) acetate tetrahydrate, cobalt(II) chloride hexahydrate, cobalt(II) nitrate hexahydrate and cobalt(II) sulfate heptahydrate. A Ni precursor may include, for example, nickel(II) chloride hexahydrate, nickel(II) nitrate hexahydrate, and nickel(II) sulfate hexahydrate. A Fe precursor may include, for example, iron(II) chloride tetrahydrate, iron(II) sulfate heptahydrate, iron(III) chloride anhydrous, iron(III) nitrate nonahydrate, and ammonium iron(III) sulfate dodecahydrate. A Mo precursor may include, for example, ammonium heptamolybdate, ammonium molybdate tetrahydrate, molybdenum hexacarbonyl (Mo(CO)6), ammonium paramolybdate ((NH4)6Mo7O24 4H2O), and ammonium tetrathiomolybdate ((NH4)2MoS4). A V precursor may include, for example, ammonium metavanadate (NH4VO3).

The active metal precursor may include, for example, a precursor of a main catalytic metal including at least one of Co, Ni and Fe, and a precursor of an auxiliary catalytic metal including at least one of Mo, V, Ta and Ti. By properly combining a main catalyst and an auxiliary catalyst, a shape, a size, a density and a yield of a metal oxide-carbon nanomaterial composite 100 may be controlled. For example, the main catalyst may be present in an amount of 0.5 wt % to 30 wt % in the metal oxide particle 110 and the auxiliary catalyst may be present in an amount of 0.1 wt % to 10 wt % in the metal oxide particle 110. The yield may tend to increase as the amount of the main catalyst increases. However, this is merely an example, and the present disclosure is not limited thereto.

In operation 620, an acidic material may be added. The added acidic material may be used to form a uniform active metal layer by preventing active metals from being entangled or precipitated. The acidic material may be, for example, dicarboxylic acid or tricarboxylic acid, and may include at least one of citric acid, tartaric acid, lactic acid, oxalic acid, succinic acid, malonic acid, malic acid, maleic acid, adipic acid, salicylic acid, glycolic acid, ascorbic acid, benzoic acid and phthalic acid. However, the present disclosure is not limited thereto.

When the active metal layer 120 is formed in operation 620, the metal oxide particle 110 on which the active metal layer 120 is formed may be calcined. For example, the active metal layer 120 may be calcined at a temperature of 400° C. to 800° C.

Referring to FIGS. 5 and 6, in operation 630, the carbon nanomaterial 120 may be grown on the active metal layer 112. The carbon nanomaterial 120 may be grown by, for example, a chemical vapor deposition (CVD), a plasma-enhanced chemical vapor deposition (PECVD), a thermal CVD or a vapor phase synthesis. For example, when the CVD is used to grow a carbon nanomaterial, metal oxide may be added to a CVD reactor and may be heated to a carbon nanomaterial synthesis temperature in an inert gas atmosphere, carbon nanomaterial synthesis gas may be supplied and the active metal layer 120 may be used as a catalyst. In the CVD reactor, a carbon source gas, a mixture of the carbon source gas and an inert gas, a mixture of the carbon source gas and a reducing gas, or a mixture of the carbon source gas, the inert gas and the reducing gas may be supplied at a flow rate of 60 milliliters per minutes (ml/min) to 300 ml/min. By supplying the above gases to flow upwards and by floating the metal oxide particle 110 on which the active metal layer 112 is formed, the carbon nanomaterial 120 may be grown on the active metal layer 112 formed on the metal oxide particle 110 based on a catalyst reaction. Through floating of metal oxide particles by upflow of gas, uniform carbon nanomaterials may be grown on the metal oxide particles. The above reaction may be performed, for example, at a temperature of 600° C. to 900° C.

The carbon source gas may be hydrocarbon-based gas, for example, acetylene ($C_2H_2$) gas, ethylene ($C_2H_4$) gas, propylene ($C_3H_6$) gas, methane ($CH_4$) gas, carbon monoxide (CO) gas or a mixture thereof. However, this is merely an example, and the carbon source gas may be all carbon source gas capable of providing raw materials of a carbon nanomaterial may be used, for example, alkane-based carbon source gas, alkene-based carbon source gas and alkyne-based carbon source gas. The above CVD reaction may be performed in an inert gas atmosphere, for example, argon (Ar), nitrogen gas ($N_2$) or helium (He) at a temperature of a room temperature to a synthesis temperature. In the CVD reactor, a pressure of 10 torr to a normal pressure may desirably be maintained. The carbon nanomaterial 120 grown on the active metal layer 112 through the above process may have, for example, a diameter of 5 nm to 100 nm.

The carbon nanomaterial 120 may include, for example, at least one of an SWCNT, a DWCNT, an MWCNT or a carbon nanorod.

The carbon nanomaterial 120 may be grown in a reactor for a period of 10 min to 1 hour. However, this is merely an example and the present disclosure is not limited thereto. When a reaction time of mixed gas increases, a density of a structure of the metal oxide-carbon nanomaterial composite 100 may increase and each of carbon nanomaterials 120 may become sufficiently longer.

The active metal layer 112 formed on the surface of the metal oxide particle 110 may be left even after the carbon nanomaterial 120 is grown as shown in FIG. 5. However, the active metal layer 112 may disappear after the carbon nanomaterial 120 is formed as shown in FIG. 1 because the active metal layer 112 functions as a catalyst to facilitate a synthesis of the carbon nanomaterial 120.

When the carbon nanomaterial 120 is grown, a functional group may be attached onto the carbon nanomaterial 120 although not shown. The functional group may be used to properly attach a catalyst that is formed for use in fuel cell electrodes onto the surface of the carbon nanomaterial 120. Also, the function group may be used to increase an electrical conductivity, a stability or a variety of performances of the metal oxide-carbon nanomaterial composite 100 by modifying the surface of the carbon nanomaterial 120.

The metal oxide-carbon nanomaterial composite 100 may have a shape of a sea urchin or a cocoon. For example, the metal oxide-carbon nanomaterial composite 100 may have a shape similar to that of the sea urchin or the cocoon because carbon nanomaterials 120 extend radially from the surface of the metal oxide particle 110.

As described above, a metal oxide-carbon nanomaterial composite according to an embodiment may have a shape of a sea urchin or a cocoon, and thus it is possible to increase an activity by promoting an electrochemical reaction using mesopores or macropores between a plurality of metal oxide-carbon nanomaterial composites when the metal oxide-carbon nanomaterial composites are used as catalyst supports on which catalysts for fuel cell electrodes are supported. Also, it is possible to efficiently discharge water and supply oxygen. Therefore, the metal oxide-carbon nanomaterial composite may be excellent in an electrical conductivity and a mechanical strength, to be used to manufacture an electrode of a fuel cell with an excellent performance.

Hereinafter, the present disclosure will be described in detail with reference to examples. However, the technical idea of the present disclosure is not limited or restricted to the examples.

[Preparation of Catalyst Support: Preparation of Active Metal Layer/Metal Oxide-Carbon Nanomaterial Composite]

Figure 7:
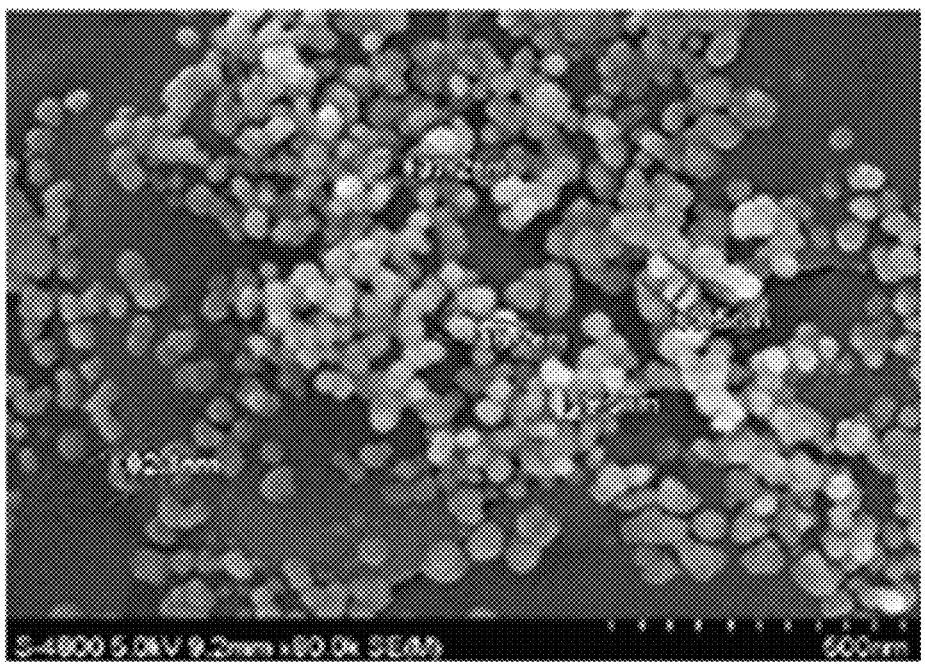
FIG. 7 is a scanning electron microscopy (SEM) image of cobalt-molybdenum (CoMo)/alumina (Al2O3) support on which a CoMo layer is formed according to an embodiment.
Figure 8:
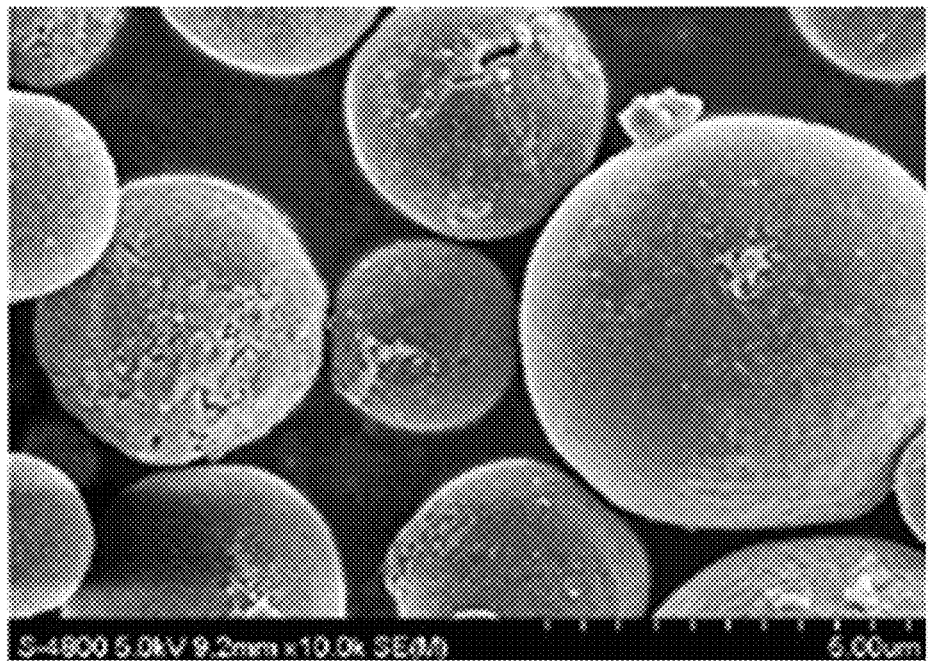
FIG. 8 is an enlarged SEM image of the CoMo/Al2O3 support of FIG. 7.

0.87 g of cobalt nitrate as a main catalyst, 0.12 g of ammonium heptamolybdate as an auxiliary catalyst and 0.07 g of citric acid as an acidic material were dissolved in 20 ml of distilled water. The above solution was added to 3 g of spherical alumina and was stirred for 30 min. Moisture was removed from the stirred solution using a rotary evaporator at 60° C. and 20 millibars (mbar), to obtain a cobalt-molybdenum (CoMo)/alumina ($Al_2O_3$) support on which a CoMo active metal layer is formed. The CoMo/$Al_2O_3$ support was dried in an oven at 120° C. overnight. The dried CoMo/$Al_2O_3$ support was calcined at a heating rate of 10° C./min in a muffle furnace at 750° C. for four hours. FIG. 7 is a scanning electron microscopy (SEM) image of a CoMo/Al2O3 support on which a CoMo layer is formed according to an embodiment, and FIG. 8 is an enlarged SEM image of the CoMo/Al2O3 support of FIG. 7. As shown in FIGS. 7 and 8, the CoMo active metal layer is properly formed on a smooth spherical alumina surface. 0.5 g of the calcined CoMo/Al2O3 support was placed in a quartz reactor with frits, was heated to 700° C. under a nitrogen atmosphere in which nitrogen flows upwards, and a mixture of ethylene gas, hydrogen gas and nitrogen gas in a volume ratio of 1:1:1 was allowed to flow at a flow rate of 120 ml/min and to react with CoMo/Al2O3 support for 30 min, to obtain an alumina-CNT composite.

Figure 9:
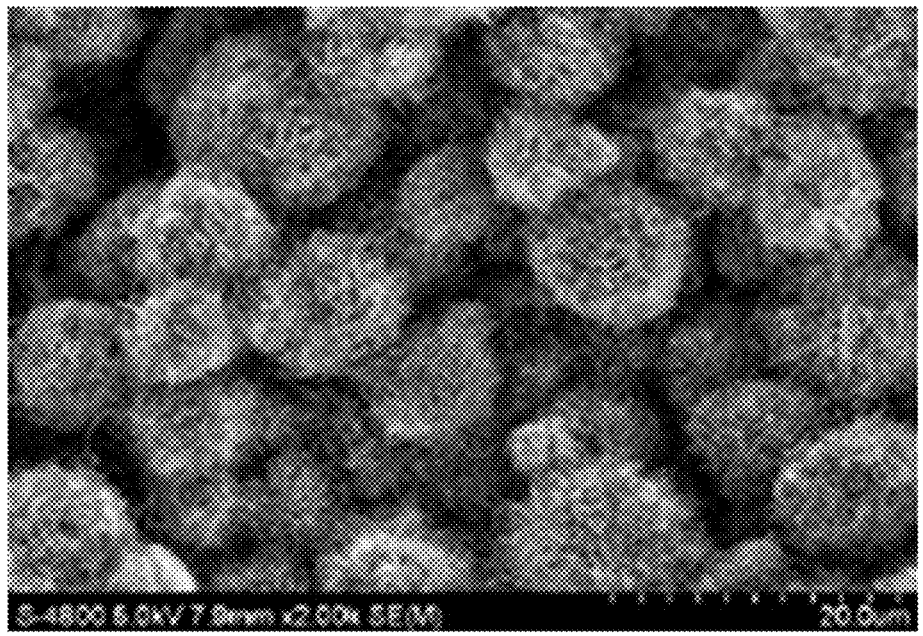
FIG. 9 is an SEM image of an Al2O3/CoMo-carbon nanotube (CNT) composite according to an embodiment.
Figure 10:
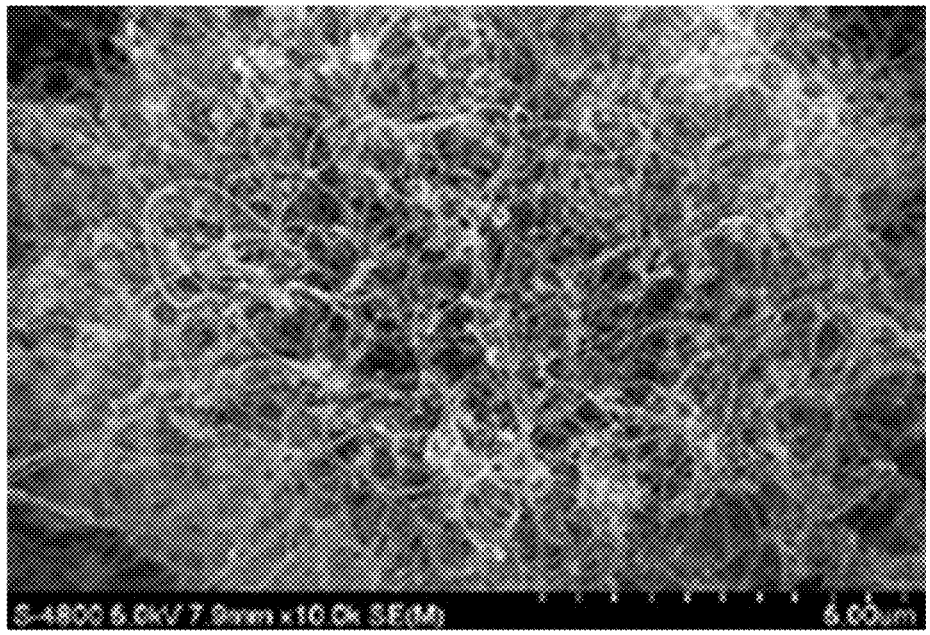
FIG. 10 is an enlarged SEM image of the Al2O3/CoMo-CNT composite of FIG. 9.
Figure 11:
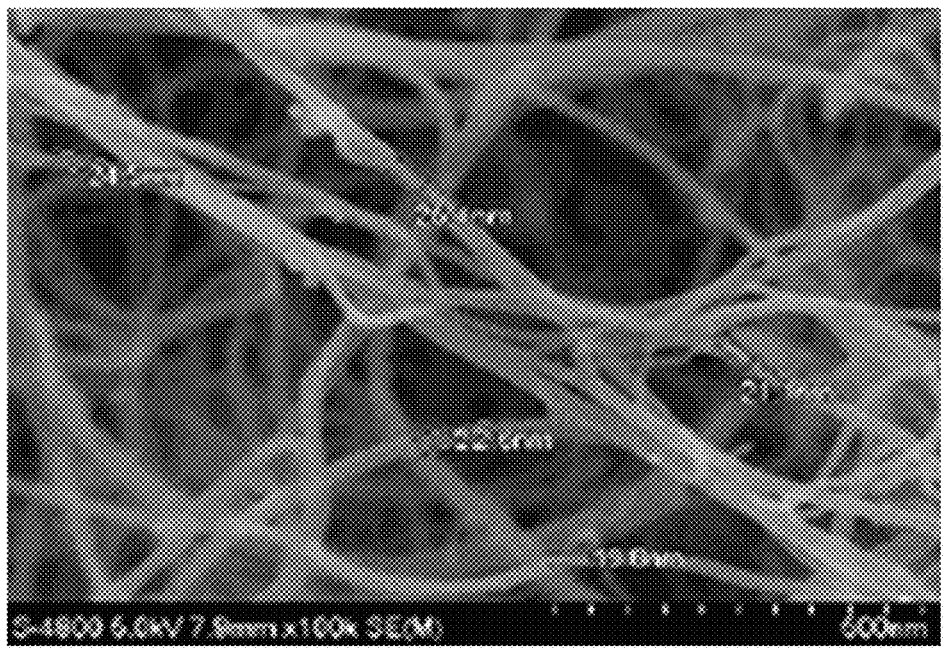
FIG. 11 is an enlarged SEM image of CNTs in the Al2O3/CoMo-CNT composite of FIG. 10.

FIG. 9 is an SEM image of an Al2O3/CoMo-CNT composite according to an embodiment, FIG. 10 is an enlarged SEM image of the Al2O3/CoMo-CNT composite of FIG. 9, and FIG. 11 is an enlarged SEM image of CNTs in the Al2O3/CoMo-CNT composite of FIG. 10. As shown in FIGS. 9 and 10, the Al2O3/CoMo-CNT composite has a shape of a sea urchin or a cocoon.

[Support of Pt Catalyst Particles: Preparation of Catalyst for Fuel Cell Electrodes]

To verify applicability of a metal oxide-carbon nanomaterial composite according to an embodiment as a support of a catalyst for fuel cell electrodes, a fuel cell catalyst was prepared using an alumina-CNT composite prepared as described above and a catalyst layer was prepared based on the fuel cell catalyst.

The alumina-CNT composite was dispersed in 200 ml of ethylene glycol. 1.3 g of a solution including 5 wt % of PtCl2 was added to a solution in which the alumina-CNT composite was dispersed, and the resultant solution was sufficiently stirred (based on 40 wt % of Pt to be supported on the alumina-CNT composite). The solution was titrated to pH 11 using a 1.0 M sodium hydroxide (NaOH) solution and was sufficiently stirred. The solution was synthesized with Pt using a microwave support scheme in which a temperature was raised to 160° C. within 1 min and maintained for 10 min. After cooling to the room temperature was performed, the alumina-CNT composite on which Pt is supported was filtered and sufficiently washed with deionized water. A prepared sample was quickly frozen and dried using a freezing dryer. Pt particles supported on CNTs were synthesized as particles with a diameter of about 5 nm. In the prepared catalyst for fuel cell electrodes, active metal particles for fuel cell electrodes, for example, Pt, were uniformly distributed and attached onto a surface of the Al2O3/CoMo-CNT composite. It can be found that grown catalysts having a shape of a sea urchin or a cocoon are connected in a network structure in manufacturing of electrodes. Thus, it is possible to increase activity of a plurality of catalysts that accelerate an electrochemical reaction using mesopores or macropores between the catalysts, and also possible to efficiently discharge water and sufficiently supply oxygen, which may indicate an excellent electrical conductivity.

According to embodiments, a metal oxide-carbon nanomaterial composite may have a shape of a sea urchin or a cocoon and may include a carbon nanomaterial having a relatively large specific surface area, and thus it is possible to support a large amount of an active metal for fuel cell electrodes as a catalyst on a surface of the carbon nanomaterial. When an aggregate of a plurality of metal oxide-carbon nanomaterial composites is formed, a carbon nanomaterial may function as a buffer to absorb an impact between the plurality of metal oxide-carbon nanomaterial composites, and mesopores and macropores may be formed between the plurality of metal oxide-carbon nanomaterial composites, and thus it is possible to increase an active surface area of an active metal for fuel cell electrodes as a catalyst that accelerates an electrochemical reaction and also possible to secure a path for efficiently discharging water and sufficiently supplying oxygen. Since the metal oxide-carbon nanomaterial composite is excellent in a stability, an electrical conductivity and a mechanical strength, electrodes of a fuel cell or a secondary battery with an excellent performance may be manufactured when the metal oxide-carbon nanomaterial composite is used as a catalyst support for fuel cell electrodes or as an anode or a cathode of the secondary battery.

Hereinafter, a catalyst, a catalyst layer that includes the catalyst and that is used for fuel cell electrodes, and a method of preparing the catalyst will be described in detail with reference to embodiments and drawings. However, the present disclosure is not limited to these embodiments and drawings.

According to an embodiment, a catalyst may include a metal oxide-carbon nanomaterial composite in which a carbon nanomaterial is formed on a metal oxide particle, and an active metal particle formed on a surface of the carbon nanomaterial.

The catalyst may include a metal oxide-carbon nanomaterial composite that has a shape of a sea urchin or a cocoon and that is used as a support, and mesopores may be secured between a plurality of catalysts. Thus, it is possible to increase an active surface area of a catalyst that accelerates an electrochemical reaction and also possible to efficiently discharge water and supply oxygen.

Figure 12:
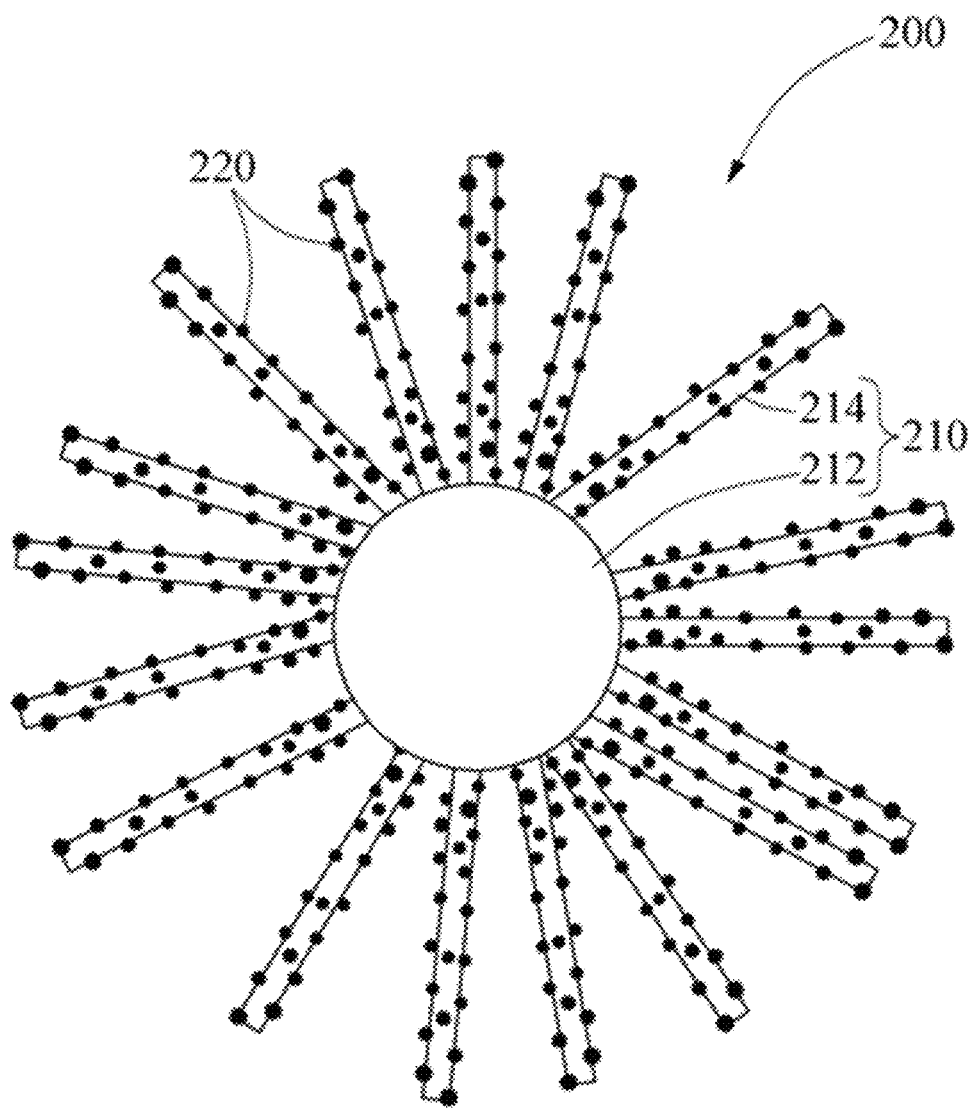
FIG. 12 is a diagram illustrating a catalyst according to an embodiment.

FIG. 12 is a diagram illustrating a catalyst 200 according to an embodiment. Referring to FIG. 12, the catalyst 200 may include a metal oxide-carbon nanomaterial composite 210 as a support, and an active metal particle 220. The metal oxide-carbon nanomaterial composite 210 may include a metal oxide particle 212 and a carbon nanomaterial 214 formed on the metal oxide particle 212. Relative sizes of the metal oxide particle 212, the carbon nanomaterial 214 and the active metal particle 220 in FIG. 12 may be expressed to be exaggerated for understanding of a configuration of the catalyst 200, and may be different from actual relative sizes of the metal oxide particle 212, the carbon nanomaterial 214 and the active metal particle 220.

The metal oxide particle 212 may include at least one of silica, alumina, magnesia, titania, barium titania, zirconia, ceria, germania, manganese oxide and zeolite.

The metal oxide particle 212 may desirably have a spherical shape so that carbon nanomaterials 214 may be uniformly and radially formed, however, there is no limitation thereto. Depending on circumstances, nonspherical particles may be used to more effectively secure and utilize a space due to an irregular shape of the nonspherical particles.

The metal oxide particle 212 may have a diameter of 0.3 μm to 10 μm, and desirably a diameter of 2 μm to 5 μm. When the diameter of the metal oxide particle 212 is less than 0.3 μm, a space in which an active metal particle is to be effectively supported may not be secured due to a small space between formed carbon nanomaterials. When the diameter of the metal oxide particle 212 exceeds 10 μm, it may be difficult to obtain a desired electrical conductivity even though a size of pores between particles increases.

The metal oxide particle 212 may be present in an amount of 20 wt % to 98 wt % in the catalyst 200. When the amount of the metal oxide particle 212 is less than 20 wt %, it may be difficult to discharge water generated in an oxygen reduction reaction (ORR) due to a decrease in a gap between carbon caused by a relatively large amount of the carbon nanomaterial 214. Accordingly, it may be difficult to efficiently supply oxygen to a catalyst layer. When the amount of the metal oxide particle 212 exceeds 98 wt %, the amount of the carbon nanomaterial 214 in the catalyst 200 may be relatively reduced and the amount of the metal oxide particle 212 with a low electrical conductivity may excessively increase, which may lead to an increase in resistance in manufacturing of an electrode.

The metal oxide particle 212 may have a specific surface area of 5 m2/g or less, which may indicate that the surface of the metal oxide particle 212 is relatively smooth and that the metal oxide particle 212 does not have a micropore. In the present disclosure, because a surface area of carbon nanomaterials formed on the surface of the metal oxide particle 212 greatly increases despite a relatively small specific surface area due to the smooth surface of the metal oxide particle 212, a sufficient space in which a large number of active metal particles are to be supported may be provided.

The carbon nanomaterial 214 may function as a buffer to absorb an impact between particles in manufacturing of an electrode at a high pressure. The carbon nanomaterial 214 may include, for example, at least one of an SWCNT, a DWCNT, an MWCNT and a carbon nanorod. For example, when the MWCNT is used as the carbon nanomaterial 214, 3 to 20 walls may be provided, a specific surface area of the MWCNT may be increased by controlling an amount of the carbon nanomaterial 214, and the MWCNT may have a high conductivity due to an extremely large amount of graphite in comparison to carbon black or activated carbon.

The carbon nanomaterial 214 may be present in an amount of 5 wt % to 80 wt % in the catalyst 200. When the amount of the carbon nanomaterial 214 is less than 5 wt %, a sufficient space in which an active metal particle is to be supported may not be provided due to a small surface area of the metal oxide-carbon nanomaterial composite 210, and an electrical conductivity may be reduced due to a large amount of the metal oxide particle 212 corresponding to a core particle in the metal oxide-carbon nanomaterial composite 210. When the amount of the carbon nanomaterial 214 exceeds 80 wt %, a size of the metal oxide-carbon nanomaterial composite 210 may increase due to an increase in the amount of the carbon nanomaterial 214, and a density of the carbon nanomaterials 214 may increase, and accordingly a space between carbon nanomaterials 214 may disappear. Thus, mesopores or macropores to be used in the present disclosure may not be effectively provided.

The carbon nanomaterial 214 may have a diameter of 5 nm to 100 nm. When the carbon nanomaterial 214 is a CNT, a diameter of the CNT may refer to an external diameter of the CNT. A cross section of a tube form may be circular and may include a hollow or a pore having an elliptical shape or a slightly distorted ellipse. The hollow or pore may have all shapes recognized as a circular shape or elliptical shape. When the diameter of the carbon nanomaterial 214 is less than 5 nm, carbon nanomaterials generated at the same yield may be entangled, which may lead to a reduction in a pore size. When the diameter of the carbon nanomaterial 214 exceeds 100 nm, a larger amount of carbon nanomaterials may be used in a required conductivity percolation due to an increase in a gap between carbon nanomaterials.

The metal oxide-carbon nanomaterial composite 210 may have a specific surface area of 20 m2/g to 100 m2/g. When the specific surface area of the metal oxide-carbon nanomaterial composite 210 is less than 20 m2/g, a sufficient surface area in which an active metal particle is to be supported may not be provided. When the specific surface area of the metal oxide-carbon nanomaterial composite 210 exceeds 100 m2/g, an aspect ratio of the carbon nanomaterial 214 may increase, carbon nanomaterials 214 may be vertically grown to be entangled with each other for thermodynamic stability, which may lead to a reduction in a number of pores between the carbon nanomaterials 214. It may be difficult to efficiently discharge water and supply oxygen to an air electrode in manufacturing of an electrode of a fuel cell.

The metal oxide-carbon nanomaterial composite 210 may have a shape of a sea urchin or a cocoon. For example, the metal oxide-carbon nanomaterial composite 210 may have a shape similar to that of the sea urchin or the cocoon because carbon nanomaterials 214 extend radially from the surface of the metal oxide particle 212.

The active metal particle 220 may include, for example, at least one of Pt, Au, Ru, Pd, Rh, Ir, Os, Nb, titanium (Ti), V, Cr, Mn, Fe, Co, Ni, copper (Cu), zinc (Zn), aluminum (Al), Mo, selenium (Se), tin (Sn), tungsten (W), tantalum (Ta) and lead (Pb).

The active metal particle 220 may be properly selected based on a specific reaction to which the catalyst 200 is to be applied and a specific place in which the catalyst 200 is to be used. The active metal particle 220 may be a single metal or an alloy of at least two metals. In an example, when the catalyst 200 is used in a catalyst layer of a cathode or an anode of a fuel cell, for example, a PAFC or a PEMFC, Pt may be used as the active metal particle 220. In another example, when the catalyst 200 is used in a catalyst layer of an anode of a DMFC, a Pt—Ru alloy may be used as the active metal particle 220. In still another example, when the catalyst 200 is used in a catalyst layer of a cathode of a DMFC, Pt may be used as the active metal particle 220.

The active metal particle 220 may have a diameter of 2 nm to 10 nm, desirably a diameter of 5 nm to 8 nm which indicates an excellent durability with respect to Pt dissolution. When the diameter of the active metal particle 220 is less than 2 nm, the active metal particle 220 may be dissolved in a reaction condition in response to an increase in current to be used or at high voltage. When the diameter of the active metal particle 220 exceeds 10 nm, an active surface area of the active metal particle 220 may decrease, which may lead to a reduction in an intrinsic activity of the catalyst 200.

The active metal particle 220 may be present in an amount of 10 wt % to 80 wt % in the catalyst 200. When the amount of the active metal particle 220 in the catalyst 200 is less than 10 wt %, an activity may be insufficiently expressed. When the amount of the active metal particle 220 in the catalyst 200 exceeds 80 wt %, an active surface area effective for a reaction may decrease due to an increase in a size of the active metal particle 220, and a problem may occur in manufacturing of the catalyst 200 because it is difficult to control the size of the active metal particle 220.

The catalyst 200 may further include a functional group (not shown) on a surface of the carbon nanomaterial 214. The functional group may be used to properly attach the active metal particle 220 onto the surface of the carbon nanomaterial 214. Also, the functional group may be used to increase an electrical conductivity, a stability or a variety of performances of the catalyst 200 by modifying the surface of the carbon nanomaterial 214.

According to an embodiment, a catalyst layer for fuel cell electrodes may include the above-described catalysts.

Figure 14:
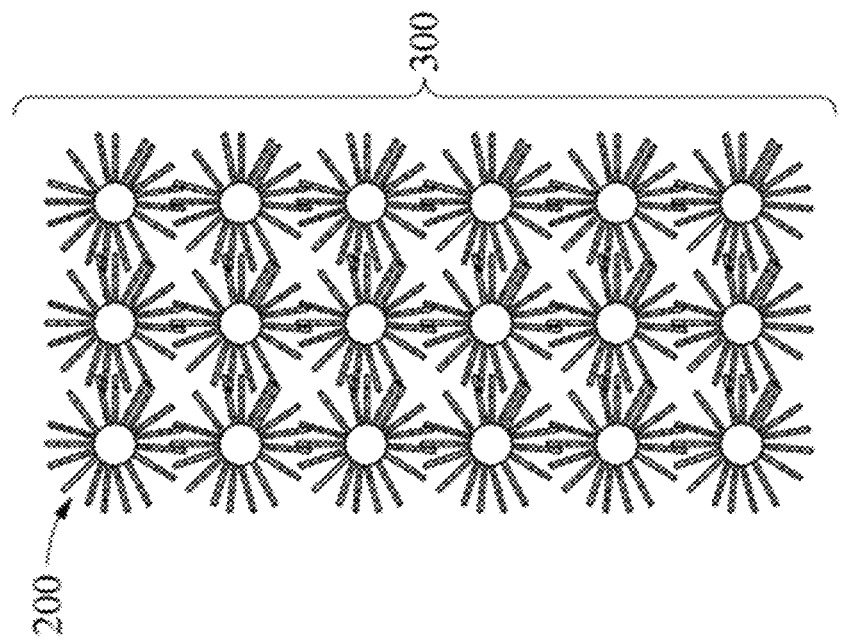
FIG. 14 is a diagram illustrating another example of a catalyst layer according to an embodiment.
Figure 13:
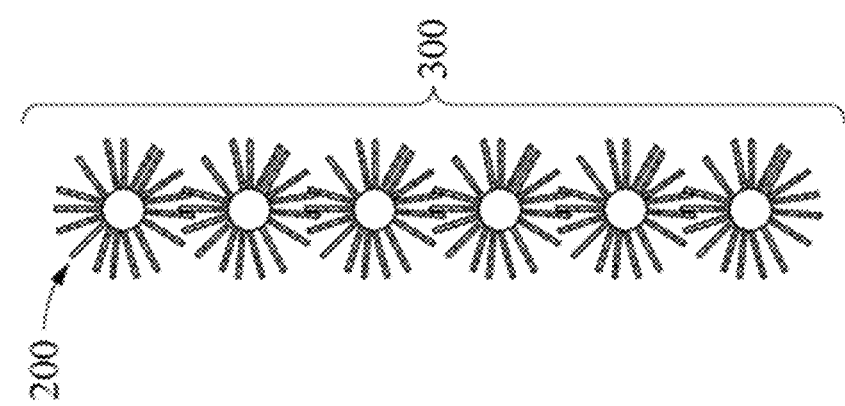
FIG. 13 is a diagram illustrating an example of a catalyst layer according to an embodiment.

FIG. 13 is a diagram illustrating an example of a catalyst layer 300 according to an embodiment, and FIG. 14 is a diagram illustrating another example of the catalyst layer 300 according to an embodiment. Referring to FIGS. 13 and 14, the catalyst layer 300 may be formed by aggregating a plurality of catalysts 200. Through mesopores and macropores between the plurality of catalysts 200, water may be efficiently discharged and oxygen may be supplied.

The catalyst layer 300 may include mesopores with an average diameter of 2 nm to 50 nm, macropores with an average diameter 50 nm or greater, or both, and the mesopores and the macropores may be formed between the catalysts 200. The mesopores formed between the catalysts 200 may have an average diameter of 2 nm to 50 nm, desirably an average diameter of 5 nm to 30 nm. When the average diameter of the pores is less than 2 nm, it may be difficult to form a three (triple) phase interface in which an oxidation-reduction reaction is performed in an air electrode of a fuel cell, fuel materials, for example, H+ or O2, supplied to the catalyst layer 300 may not be efficiently diffused, thereby impeding a flow of the fuel materials. When the average diameter of the pores exceeds 50 nm, an electrical conductivity in an electrode may decrease even though water generated in a reaction is efficiently discharged, thereby reducing an efficiency of a catalyst. The catalyst layer 300 may include open pore channels three-dimensionally connected to each other due to an interstitial volume between the catalysts 200.

The catalyst layer 300 may be a single layer or multiple layers formed by the catalysts 200. Multilayers formed by the catalysts 200 may range from, for example, 1 to 10.

As shown in FIG. 13, a single layer may be formed as a catalyst layer 300 by the catalysts. As shown in FIG. 14, three layers may be formed as catalyst layers 300 by the catalysts 200.

The catalyst layer 300 may have a thickness of 1 μm to 100 μm. In an example, when a single catalyst layer 300 is formed, a single catalyst 200 may have a size of 1 μm. In another example, when ten catalyst layers 300 are formed, ten catalysts 200 may have a total size of 100 μm.

A fuel cell may include a cathode, an anode and an electrolyte membrane that is interposed between the anode and the cathode. At least one of the cathode and the anode may include the catalyst layer 300 with the catalysts 200. The fuel cell may be implemented as, for example, a PAFC, a PEMFC, a DMFC or an AFC.

According to an embodiment, a method of preparing a catalyst may include forming a metal oxide-carbon nanomaterial composite by forming a carbon nanomaterial on a metal oxide particle having a specific surface area of 5 m2/g or less, and forming an active metal particle on a surface of the carbon nanomaterial by adding the metal oxide-carbon nanomaterial composite in a solution including an active metal precursor.

Impregnation schemes for preparing catalysts may be classified into an adsorption scheme, an evaporation drying scheme, a spray scheme and an incipient wetness impregnation scheme, based on a contact scheme of a metal oxide-carbon nanomaterial composite and active metal particles. In the adsorption method, a metal oxide-carbon nanomaterial composite may be immersed in a solution in which an active metal precursor is dissolved, to absorb active metal particles to a surface of the metal oxide-carbon nanomaterial composite so that the active metal particles may be supported. In the evaporation drying scheme, a metal oxide-carbon nanomaterial composite may be immersed in a solution in which an active metal precursor is dissolved, and a solvent may be vaporized, to attach active metal particles to the metal oxide-carbon nanomaterial composite. In the spray scheme, a metal oxide-carbon nanomaterial composite may be placed in an evaporator and a solution with an active metal precursor may be sprayed while the evaporator is shaken, to support active metal particles. However, a relatively large amount of active materials may be attached to an outer surface of the metal oxide-carbon nanomaterial composite instead of pores of the metal oxide-carbon nanomaterial composite. The incipient wetness impregnation scheme is most widely used. In the incipient wetness impregnation scheme, a solution in which an active metal precursor is dissolved in a solvent may be absorbed to a dried metal oxide-carbon nanomaterial composite and may be dried to remove the solvent. The active metal precursor may be used in an amount corresponding to a pore volume of the metal oxide-carbon nanomaterial composite. To uniformly distribute the supported active metal particles on the metal oxide-carbon nanomaterial composite, the evaporation drying scheme or the incipient wetness impregnation scheme may be advantageously used, however, present disclosure is not limited thereto.

Figure 15:
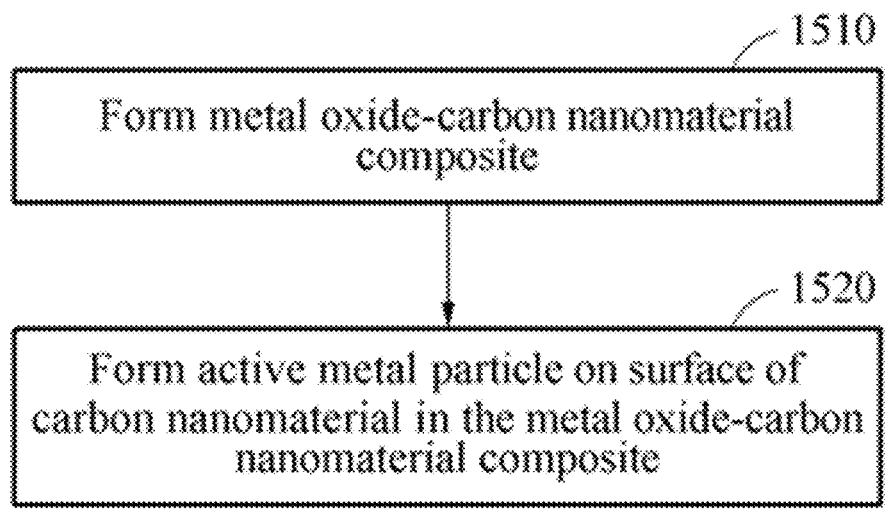
FIG. 15 is a flowchart illustrating a method of preparing a catalyst according to an embodiment.

FIG. 15 is a flowchart illustrating a method of preparing a catalyst according to an embodiment. Referring to FIG. 15, the method may include operation 1510 of forming a metal oxide-carbon nanomaterial composite and operation 1520 of forming an active metal particle.

In operation 1510, the metal oxide-carbon nanomaterial composite may be formed by forming a carbon nanomaterial on a metal oxide particle having a specific surface area of 5 m2/g or less. The carbon nanomaterial may be formed on the metal oxide particle even through the metal oxide particle has a relatively small surface area due to a smooth surface of the metal oxide particle, and accordingly a surface on which active metal particles are to be formed may be easily secured.

The metal oxide particle may include at least one of silica, alumina, magnesia, titania, barium titania, zirconia, ceria, germania, manganese oxide and zeolite.

The carbon nanomaterial may include, for example, an SWCNT, a DWCNT, an MWCNT and a carbon nanorod.

The metal oxide-carbon nanomaterial composite may have a shape of a sea urchin or a cocoon. For example, the metal oxide-carbon nanomaterial composite may have a shape similar to that of the sea urchin or the cocoon because carbon nanomaterials extend radially from the surface of the metal oxide particle.

In operation 1520, the active metal particle may be formed on a surface of the carbon nanomaterial by adding the metal oxide-carbon nanomaterial composite in a solution including an active metal precursor. The active metal precursor may include, for example, at least one of Pt, Au, Ru, Pd, Rh, Ir, Os, Nb, Ti, V, Cr, Mn, Fe, Co, Ni, Cu, Zn, Al, Mo, Se, Sn, W, Ta and Pb.

To form the carbon nanomaterial on the metal oxide particle, the carbon nanomaterial may be grown or attached onto the metal oxide particle. The carbon nanomaterial may be grown by, for example, a CVD, a PECVD, a thermal CVD or a vapor phase synthesis. For example, when the CVD is used to grow a carbon nanomaterial, a main active metal, for example, Co, Ni or Fe, and an auxiliary active metal, for example, Mo, Ta, Ti or Mn, may be supported on metal oxide, the metal oxide may be added to a CVD reactor and may be heated to a carbon nanomaterial synthesis temperature in an inert gas atmosphere, and carbon nanomaterial synthesis gas may be supplied so that the carbon nanomaterial may be grown on the metal oxide particle. Carbon nanomaterial synthesis gas for depositing carbon nanomaterials may include hydrocarbon-based gas, for example, acetylene (C2H2) gas, ethylene (C2H4) gas, propylene (C3H6) gas, methane (CH4) gas or carbon monoxide (CO) gas. The above CVD reaction may be performed in an inert gas atmosphere, for example, Ar, N2 or He at a temperature of a room temperature to a synthesis temperature. The above carbon nanomaterial synthesis may be performed at a temperature of 600° C. to 900° C., desirably for a period of 10 min to 1 hour. In the CVD reactor, a pressure of 10 torr to a normal pressure may desirably be maintained. The carbon nanomaterial grown on the metal oxide particle through the above process may have, for example, a diameter 5 nm to 100 nm.

When the metal oxide-carbon nanomaterial composite is formed, a functional group may be attached onto the carbon nanomaterial although not shown. The functional group may be used to properly attach the active metal particle onto the surface of the carbon nanomaterial. To introduce the functional group, an active metal precursor may be supported after a strong acid treatment or weak acid treatment. Also, the function group may be used to increase an electrical conductivity, a stability or a variety of performances of the metal oxide-carbon nanomaterial composite by modifying the surface of the carbon nanomaterial.

As described above, a catalyst according to an embodiment may include a metal oxide-carbon nanomaterial composite having a shape of a sea urchin or a cocoon, and thus it is possible to increase activity of a plurality of catalysts that accelerate an electrochemical reaction using mesopores or macropores between the catalysts, and also possible to efficiently discharge water and supply oxygen. In addition, a catalyst layer including the catalyst may be excellent in an electrical conductivity and a mechanical strength, and thus electrodes of a fuel cell with an excellent performance may be manufactured.

Hereinafter, the present disclosure will be described in detail with reference to examples. However, the technical idea of the present disclosure is not limited or restricted to the examples.

[Preparation of CNT on Alumina: Preparation of Metal Oxide-Carbon Nanomaterial Composite]

0.87 g of cobalt nitrate, 0.12 g of ammonium heptamolybdate and 0.07 g of citric acid were dissolved in 20 ml of distilled water. The above solution was added to 3 g of spherical alumina and was stirred for 30 min. Moisture was removed from the stirred solution using a rotary evaporator at 60° C. and 20 mbar, to obtain an alumina support. The alumina support was dried in an oven at 120° C. overnight. The dried alumina support was calcined at a heating rate of 10° C./min in a muffle furnace at 750° C. for four hours. 0.5 g of the calcined alumina support was placed in a quartz reactor with frits, was heated to 700° C. under a nitrogen atmosphere in which nitrogen flows upwards, a mixture of ethylene gas, hydrogen gas and nitrogen gas in a volume ratio of 1:1:1 was allowed to flow at a flow rate of 120 ml/min and to react with the alumina support for 30 min.

[Support of Pt as Active Metal Particle: Preparation of Catalyst]

An alumina-CNT composite was dispersed in 200 ml of ethylene glycol. 1.3 g of a solution including 5 wt % of PtCl2 was added to a solution in which the alumina-CNT composite was dispersed, and the resultant solution was sufficiently stirred (based on 40 wt % of Pt to be supported on the alumina-CNT composite). The solution was titrated to pH 11 using a 1.0 M NaOH solution and was sufficiently stirred. The solution was synthesized with Pt using a microwave support scheme in which a temperature was raised to 160° C. within 1 min and maintained for 10 min. After cooling to the room temperature was performed, the alumina-CNT composite on which Pt is supported was filtered and sufficiently washed with distilled water. A prepared sample was quickly frozen and dried using a freezing dryer. Pt particles supported on CNTs were synthesized as particles with a diameter of about 5 nm.

[Manufacture of Electrode: Manufacture of Electrode Including Catalyst Layer]

0.7 g of commercial ionomer (as a dispersant, a mixture of water and isopropyl alcohol (IPA) in a ratio of 1:1) that is present in an amount of 5 wt % and 5 mL of an additional solvent (as a mixture of water and IPA in a ratio of 3:2) were added per 0.1 g of a prepared catalyst (40 wt % of Pt was supported after carbon nanotubes were grown on an alumina support), and a resultant slurry was stirred overnight using a planetary stirrer. The stirred slurry was dispersed again using an ultrasonic dispenser at 10° C. for 15 min. The prepared slurry was sprayed to an electrode transfer support using a spray gun, to form an electrode. The electrode was dried for one day under the room temperature and normal pressure condition. The dried electrode was transferred through hot pressing on a Nafion membrane (at 130° C. and 100 bar). A manufactured electrode was used as a cathode and a fuel cell was manufactured by using a commercial catalyst (JM 4000) as an anode.

Figure 16:
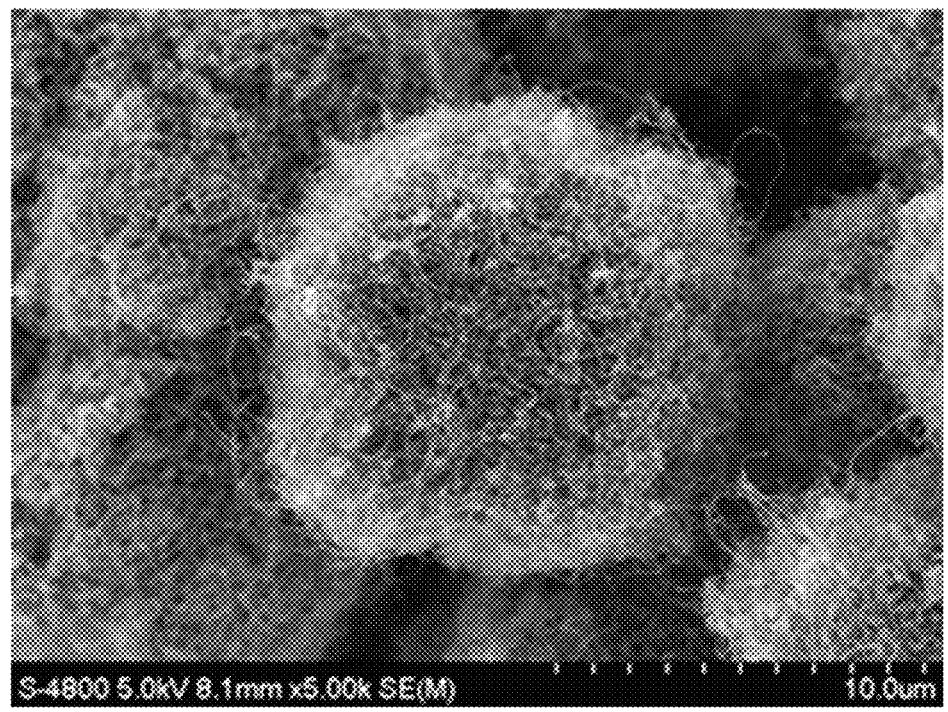
FIG. 16 is an SEM image of an alumina-CNT composite according to an embodiment.
Figure 17:
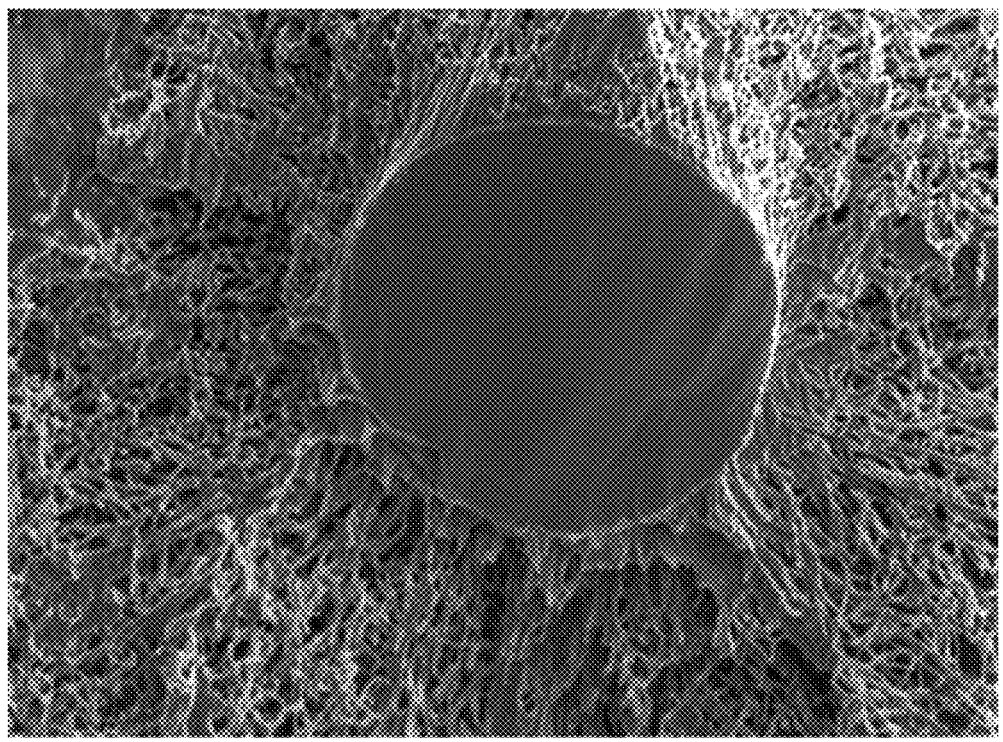
FIG. 17 is a SEM image illustrating a cross section of a CNT in an alumina-CNT composite according to an embodiment.
Figure 18:
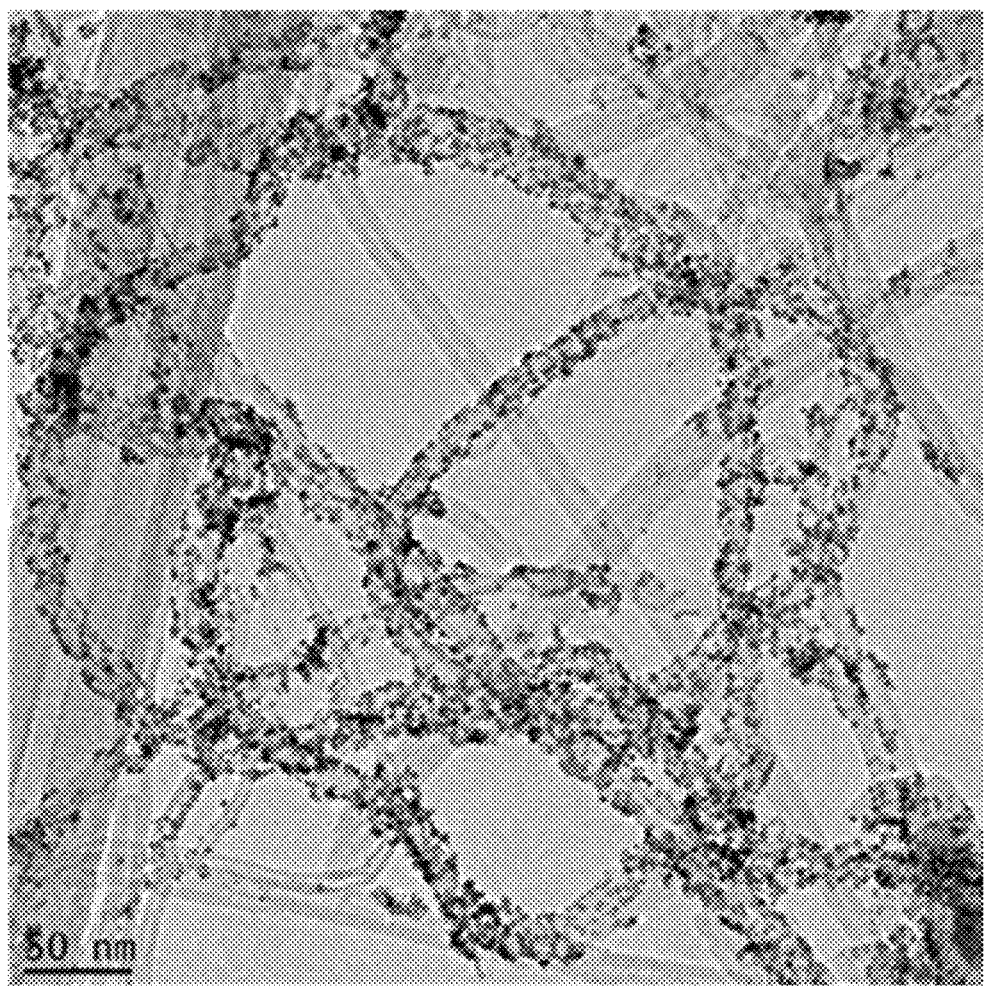
FIG. 18 is a transmission electron microscopy (TEM) image of CNTs on which platinum (Pt) particles as active metal particles are supported according to an embodiment.

FIG. 16 is an SEM image of an alumina-CNT composite according to an embodiment, and FIG. 17 is an SEM image illustrating a cross section of a CNT in an alumina-CNT composite according to an embodiment. As can be seen from FIGS. 16 and 17, a catalyst is based on an alumina-CNT composite having a shape of a sea urchin or a cocoon. FIG. 18 is a transmission electron microscopy (TEM) image of CNTs on which Pt is supported according to an embodiment. In FIG. 18, Pt particles as active metal particles are relatively uniformly distributed and attached.

Figure 19:
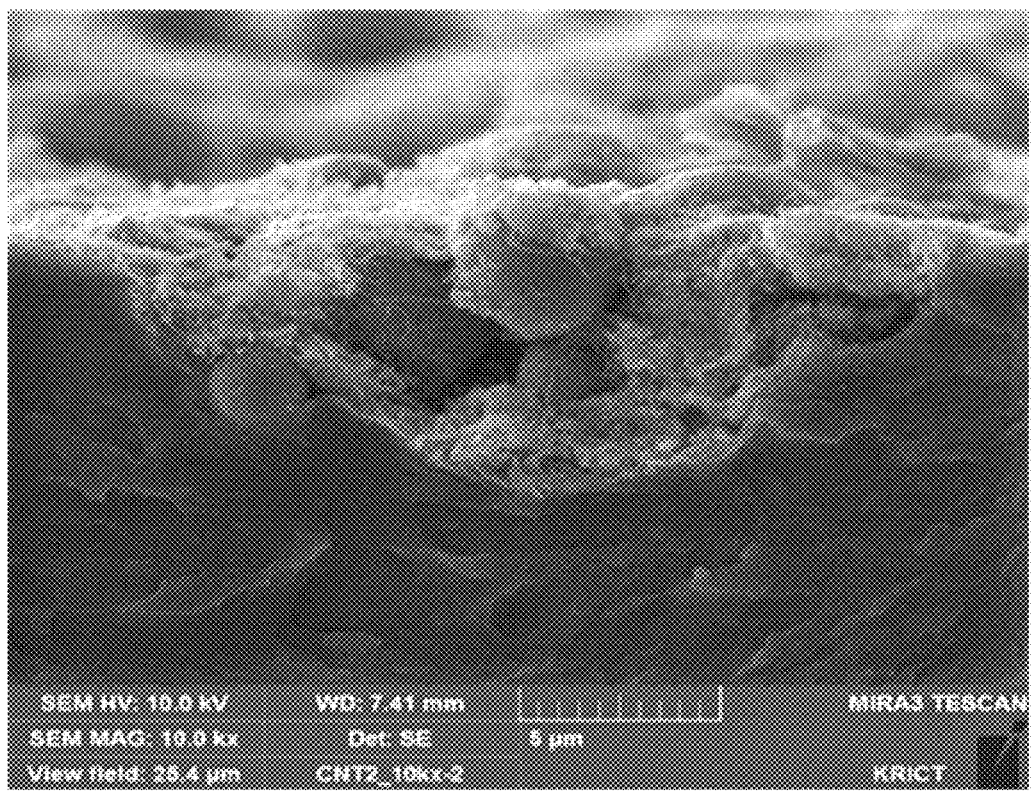
FIG. 19 is an SEM image of a cathode of a fuel cell manufactured according to an embodiment.

FIG. 19 is an SEM image of a cathode of a fuel cell manufactured according to an embodiment. In manufacturing of the cathode shown in FIG. 19, catalysts that have a shape of a sea urchin or a cocoon and that are grown from an alumina support corresponding to a core are connected in a network structure as shown in FIG. 18. It can be found that it is possible to increase activity of a plurality of catalysts that accelerates an electrochemical reaction using mesopores or macropores between the catalysts and that it is possible to efficiently discharge water and supply oxygen, which may indicate an excellent electrical conductivity.

According to embodiments, a catalyst may include a metal oxide-carbon nanomaterial composite having a shape of a sea urchin or a cocoon, and accordingly may function as a buffer to absorb an impact between metal oxide-carbon nanomaterial composites. A catalyst layer including a plurality of catalysts may have mesopores and macropores formed between the catalysts, and thus it is possible to increase activity of the catalysts to accelerate an electrochemical reaction, and also possible to secure a path for efficiently discharging water and supplying oxygen. Also, the catalyst layer may be excellent in stability, electrical conductivity, and mechanical strength, and thus it is possible to manufacture electrodes of a fuel cell with excellent performance.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the principles or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A metal oxide-carbon nanomaterial composite comprising
a metal oxide particle having a specific surface area of 5 square meters per gram ($m^2/g$) or less; and
a carbon nanomaterial formed on a surface of the metal oxide particle.

2. The metal oxide-carbon nanomaterial composite of claim 1, wherein
the metal oxide particle comprises at least one selected from the group consisting of silica, alumina, magnesia, titania, barium titania, zirconia, ceria, germania, manganese oxide and zeolite;
the metal oxide particle has a diameter of 0.3 micrometers (μm) to 10μm;
the carbon nanomaterial comprises at least one selected from the group consisting of a single-walled carbon nanotube (SWCNT), a double-walled carbon nanotube (DWCNT), a multi-walled carbon nanotube (MW-CNT) and a carbon nanorod; and
the carbon nanomaterial is present in an amount of 5% by weight (wt %) to 80 wt % in the metal oxide-carbon nanomaterial composite.

3. The metal oxide-carbon nanomaterial composite of claim 1, wherein
a length of the carbon nanomaterial is 0.05 to 3 times a diameter of the metal oxide particle; and
the carbon nanomaterial has a diameter of 5 nanometers (nm) to 100 nm.

4. The metal oxide-carbon nanomaterial composite of claim 1, wherein a weight ratio of the metal oxide particle to the carbon nanomaterial ranges from 95 : 5 to 20 : 80.

5. The metal oxide-carbon nanomaterial composite of claim 1, wherein
the metal oxide-carbon nanomaterial composite has a specific surface area of 20 $m^2/g$ to 100 $m^2/g$, and
the metal oxide-carbon nanomaterial composite has a shape of a sea urchin or a cocoon.

6. The metal oxide-carbon nanomaterial composite of claim 1 further comprising an active metal formed on the metal oxide particle,
wherein the active metal is a transition metal or a lanthanum-based element.

7. A catalyst comprising:
a metal oxide-carbon nanomaterial composite in which a carbon nanomaterial is formed on a metal oxide particle, wherein the metal oxide particle has a specific surface area of 5 square meters per gram (m2/g) or less; and
an active metal particle formed on a surface of the carbon nanomaterial.

8. The catalyst of claim 7, wherein
the metal oxide particle comprises at least one selected from the group consisting of silica, alumina, magnesia, titania, barium titania, zirconia, ceria, germania, manganese oxide and zeolite;
the metal oxide particle has a diameter of 0.3 micrometers (μm) to 10 μm;
the metal oxide particle is present in an amount of 20% by weight (wt %) to 98 wt % in the catalyst; and
the metal oxide particle has a specific surface area of 5 square meters per gram ($m^2/g$) or less.

9. The catalyst of claim 7, wherein
the carbon nanomaterial comprises at least one selected from the group consisting of a single-walled carbon nanotube (SWCNT), a double-walled carbon nanotube (DWCNT), a multi-walled carbon nanotube (MW-CNT) and a carbon nanorod;
the carbon nanomaterial is present in an amount of 5 wt % to 80 wt % in the catalyst; and
the carbon nanomaterial has a diameter of 5 nanometers (nm) to 100 nm.

10. The catalyst of claim 7, wherein
the metal oxide-carbon nanomaterial composite has a specific surface area of 20 $m^2/g$ to 100 $m^2/g$; and
the metal oxide-carbon nanomaterial composite has a shape of a sea urchin or a cocoon.

11. The catalyst of claim 7, wherein
the active metal particle comprises at least one selected from the group consisting of platinum (Pt), gold (Au), ruthenium (Ru), palladium (Pd), rhodium (Rh), iridium (Ir), osmium (Os), niobium (Nb), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tin (Sn), tungsten (W), tantalum (Ta) and lead (Pb);
the active metal particle has a diameter of 2 nm to 10 nm; and
the active metal particle is present in an amount of 10 wt % to 80 wt % in the catalyst.

12. A method of preparing a catalyst, the method comprising
forming a metal oxide-carbon nanomaterial composite by forming a carbon nanomaterial on a metal oxide particle having a specific surface area of 5 square meters per gram ($m^2/g$) or less; and
forming an active metal particle on a surface of the carbon nanomaterial by adding the metal oxide-carbon nanomaterial composite in a solution comprising an active metal precursor,
wherein the carbon nanomaterial is formed on the metal oxide particle by growing or attaching the carbon nanomaterial onto the metal oxide particle.

13. The method of claim 12 further comprising, after the forming of the metal oxide-carbon nanomaterial composite, attaching a functional group to the carbon nanomaterial.

* * * * *